United States Patent
Lemon et al.

(10) Patent No.: US 11,725,286 B2
(45) Date of Patent: Aug. 15, 2023

(54) TWO-STEP PRETREATMENT SYSTEM AND METHOD

(71) Applicant: PPG Industries Ohio, Inc., Cleveland, OH (US)

(72) Inventors: Steven J. Lemon, Lower Burrell, PA (US); Justin J. Martin, Irwin, PA (US); Kevin T. Sylvester, Lawrence, PA (US); Peter L. Votruba-Drzal, Pittsburgh, PA (US); Gordon L. Post, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 563 days.

(21) Appl. No.: 16/639,327

(22) PCT Filed: Feb. 9, 2018

(86) PCT No.: PCT/US2018/017694
§ 371 (c)(1),
(2) Date: Feb. 14, 2020

(87) PCT Pub. No.: WO2019/036062
PCT Pub. Date: Feb. 21, 2019

(65) Prior Publication Data
US 2020/0248313 A1 Aug. 6, 2020

Related U.S. Application Data

(63) Continuation-in-part of application No. PCT/US2017/046680, filed on Aug. 14, 2017.

(51) Int. Cl.
| | | |
|---|---|---|
| *C23C 22/82* | (2006.01) | |
| *C23C 22/83* | (2006.01) | |
| *C23C 22/66* | (2006.01) | |
| *C23C 22/12* | (2006.01) | |
| *C23C 22/56* | (2006.01) | |
| *C23C 22/73* | (2006.01) | |
| *C23C 22/78* | (2006.01) | |
| *C23C 22/36* | (2006.01) | |
| *C09D 5/12* | (2006.01) | |
| *C23C 22/48* | (2006.01) | |
| *C23C 22/00* | (2006.01) | |
| *C23C 22/07* | (2006.01) | |

(52) U.S. Cl.
CPC ............... *C23C 22/66* (2013.01); *C09D 5/12* (2013.01); *C23C 22/12* (2013.01); *C23C 22/361* (2013.01); *C23C 22/56* (2013.01); *C23C 22/73* (2013.01); *C23C 22/78* (2013.01); *C23C 22/82* (2013.01); *C23C 22/07* (2013.01)

(58) Field of Classification Search
CPC ..................................................... C23C 22/82
See application file for complete search history.

(56) References Cited

U.S. PATENT DOCUMENTS

| | | | |
|---|---|---|---|
| 4,828,615 A | 5/1989 | Cape | |
| 5,266,356 A | 11/1993 | Buchheit, Jr. et al. | |
| 5,411,607 A | 5/1995 | Basaly et al. | |
| 5,478,415 A | 12/1995 | Massad et al. | |
| 5,756,218 A | 5/1998 | Buchheit et al. | |
| 5,891,269 A | 4/1999 | Koerner et al. | |
| 6,315,823 B1 | 11/2001 | Dolan | |
| 7,011,895 B2* | 3/2006 | Ishizuka | C23C 28/345 428/472 |
| 7,811,366 B2 | 10/2010 | Inbe et al. | |
| 2002/0179189 A1 | 12/2002 | Homma et al. | |
| 2007/0018001 A1 | 1/2007 | Yesildag et al. | |
| 2007/0240604 A1 | 10/2007 | Inbe et al. | |
| 2011/0159315 A1 | 6/2011 | Saito et al. | |
| 2017/0306498 A1* | 10/2017 | McMillen | C23C 22/22 |

FOREIGN PATENT DOCUMENTS

| | | | |
|---|---|---|---|
| DE | 19705701 A1 | 8/1998 | |
| EP | 1504139 A2 | 2/2005 | |
| EP | 1541718 A2 | 6/2005 | |
| WO | 9851841 A1 | 11/1998 | |
| WO | 2001/012341 A1 | 2/2001 | |
| WO | WO 01/46495 * | 6/2001 | ............. C23C 22/00 |
| WO | WO 2010/088946 * | 8/2010 | ............... B05D 1/38 |

(Continued)

OTHER PUBLICATIONS

Perrotta et al., "Hydrotalcite formation on aluminum sheet and powder", J. Mater. Res., vol. 7, No. 12, Dec. 1992, pp. 3306-3313.
Mata et al., "Hierarchically organized Li—Al—LDH nano-flakes: a low-temperature approach to seal porous anodic oxide on aluminum alloys", RSC Adv. 7, 2017, pp. 35357-35367.
Buchheit et al., "Corrosion-Resistant, Chromate-Free Talc Coatings for Aluminum", Corrosion, vol. 50, No. 3, Mar. 1994, pp. 205-214.
Buchheit et al., "Chromate-Free Corrosion Resistant Conversion Coatings for Aluminum Alloys", Technical Report, 1995 Annual Meeting and Exhibition of the Minerals, Metals and Materials Society (TMS), Las Vegas, NV (USA) Mar. 1, 1995, pp. 1-11.

(Continued)

*Primary Examiner* — Lois L Zheng
(74) *Attorney, Agent, or Firm* — Alicia M. Passerin

(57) ABSTRACT

Disclosed is a system for treating a surface of a multi-metal article. The system includes first and second and/or third conversion compositions for contacting at least a portion of the surface. The first conversion composition includes phosphate ions and zinc ions and is substantially free of fluoride. The second conversion composition includes a lanthanide series metal cation and an oxidizing agent. The third conversion composition includes an organophosphate compound, an organophosphonate compound, or combinations thereof that optionally may include at least one transition metal. Methods of treating a multi-metal article using the system also are disclosed. Also disclosed are substrates treated with the system and method.

15 Claims, No Drawings

(56) References Cited

FOREIGN PATENT DOCUMENTS

WO      2013185131      12/2013
WO      2014151617 A1      9/2014

OTHER PUBLICATIONS

Taylor et al., "Environmentally Compliant Corrosion Resistant, and Electrically Conductive Inorganic Coatings for Aluminum Alloys," Center for Electrochemical Science & Engineering, University of Virginia, Dept. of Materials Science & Engineering, Aug. 2001, 352 pages.

Zhang et al., "Hydrotalcite Coating Formation on Al—Cu—Mg Alloys from Oxidizing Bath Chemistries", Corrosion, vol. 58, No. 7, 2002, 591-600.

\* cited by examiner

TWO-STEP PRETREATMENT SYSTEM AND METHOD

CROSS-REFERENCE TO RELATED APPLICATIONS

This application claims priority to PCT Application No. PCT/US2017/046680, filed on Aug. 14, 2017, and entitled "Two-Step Pretreatment System and Method" incorporated herein by reference in its entirety.

FIELD

The present invention relates to systems and methods for treating a multi-metal article. The present invention also relates to a coated multi-metal article.

BACKGROUND

The use of protective coatings on metal substrates for improved corrosion resistance and paint adhesion is common. Conventional techniques for coating such substrates include techniques that involve pretreating the metal substrate with chromium-containing compositions and/or compositions containing dissociated and bound fluoride.

For example, conversion or pretreatment compositions based predominantly on a Group IVB metal have become more prevalent. Such compositions often contain a source of free fluoride, i.e., fluoride available as isolated ions in the pretreatment composition as opposed to fluoride that is bound to another element, such as the Group IVB metal. Free fluoride can etch the surface of the metal substrate, thereby promoting deposition of a Group IVB metal coating. Nevertheless, the corrosion resistance capability of these pretreatment compositions has generally been significantly inferior to conventional chromium-containing pretreatments. Additionally, the use of Group IVB compositions imparts environmental and health concerns.

Furthermore, the use of aluminum in automotive lines is increasingly more prevalent. As a result, the processing of multi-metal articles through automotive lines also is increasingly more prevalent. However, traditional zinc phosphate conversion compositions do not provide adequate throughput on aluminum substrates resulting from the formation of by-product ($Na_3AlF_6$ and $K_2NaAl_6$) from the pretreatment process. As a result, the processing of multi-metal articles with high aluminum content through zinc phosphate processing lines has been limited problematic.

It would be desirable to provide compositions and methods for treating a metal substrate that overcome at least some of the previously described drawbacks of the prior art, including the environmental drawbacks associated with the use of chromates and fluoride/metal fluorides. It also would be desirable to provide compositions and methods for treating metal substrate that impart corrosion resistance properties that are equivalent to, or even superior to, the corrosion resistance properties imparted through the use of (zinc) phosphate- or chromium-containing conversion coatings. It would also be desirable to provide related coated metal substrates.

SUMMARY

Disclosed herein is a system for treating a surface of a multi-metal article comprising: (a) a first conversion composition for contacting at least a portion of the surface, the first conversion composition comprising phosphate ions and zinc ions and being substantially free of fluoride; and (b) a second conversion composition for treating at least a portion of the surface contacted with the first conversion composition, the second conversion composition comprising a lanthanide series metal cation and an oxidizing agent; and/or (c) a third conversion composition for treating at least a portion of the surface, the third conversion composition comprising an organophosphate compound, an organophosphonate compound, or combinations thereof.

Also disclosed is a method for treating a multi-metal article comprising: (a) contacting at least a portion of a surface of the article with a first conversion composition comprising phosphate ions and zinc ions and being substantially free of fluoride; and (b) contacting at least a portion of the contacted surface with a second conversion composition comprising a lanthanide series metal cation and an oxidizing agent; and/or (c) contacting at least a portion of the contacted surface with a third conversion composition comprising an organophosphate compound, an organophosphonate compound, or combinations thereof.

Also disclosed are substrates treated with the systems and methods of treating.

DETAILED DESCRIPTION

As mentioned above, the present invention is directed to a system for treating a surface of a multi-metal article comprising, or consisting essentially, or consisting of: (a) a first conversion composition for contacting at least a portion of the surface, the first conversion composition comprising, or consisting essentially of, or consisting of, phosphate ions and zinc ions and being substantially free of fluoride; and (b) a second conversion composition for treating at least a portion of the surface contacted with the first conversion composition, the second conversion composition comprising, consisting essentially of, or consisting of, a lanthanide series metal cation and an oxidizing agent; and/or (c) a third conversion composition for treating at least a portion of the surface contacted with the first conversion composition, the third conversion composition comprising, or consisting essentially, or consisting of, an organophosphate compound, an organophosphonate compound, or combinations thereof. Optionally, the second conversion composition also may be substantially free of fluoride.

As used herein, "multi-metal article" refers to (1) an article that has at least one surface comprised of aluminum (as defined below) and at least one surface comprised of a non-aluminum metal, (2) a first article that has at least one surface comprised of aluminum and a second article that has at least one surface comprised of a non-aluminum metal, or, (3) both (1) and (2) above. As used herein, the term "aluminum," when used in reference to a substrate, refer to substrates made of or comprising aluminum and/or aluminum alloy, and clad aluminum substrates. As used herein, the term "non-aluminum metal" refers to a metal that is not "aluminum" as defined below and includes, for example, cold rolled steel, hot rolled steel, steel coated with zinc metal, zinc compounds, or zinc alloys, such as electrogalvanized steel, hot-dipped galvanized steel, galvannealed steel, and steel plated with zinc alloy, magnesium, nickel, titanium and tin.

Suitable substrates that may be used in the present invention include metal substrates, metal alloy substrates, and/or substrates that have been metallized, such as nickel-plated plastic. The metal or metal alloy can comprise or be steel, iron, aluminum, zinc, nickel, and/or magnesium. For example, the steel substrate could be cold rolled steel, hot rolled steel, electrogalvanized steel, hot dipped galvanized steel, and/or zinc-aluminum-magnesium (ZAM) coated steel. Iron substrates could be cast iron. Aluminum alloys of the 1XXX, 2XXX, 3XXX, 4XXX, 5XXX, 6XXX, or 7XXX series as well as clad aluminum alloys also may be used as the substrate. For example, aluminum alloys may comprise 0.01% by weight copper to 10% by weight copper. Aluminum alloys which are treated may also include castings, such as 1XX.X, 2XX.X, 3XX.X, 4XX.X, 5XX.X, 6XX.X, 7XX.X, 8XX.X, or 9XX.X (e.g.: A356.0). Magnesium alloys of the AZ31B, AZ91C, AM60B, ZEK100, or EV31A series also may be used as the substrate. The substrate used in the present invention may also comprise titanium and/or titanium alloys, zinc and/or zinc alloys, and/or nickel and/or nickel alloys and/or tin and/or tin alloys. The substrate may comprise a portion of a vehicle such as a vehicular body (e.g., without limitation, door, body panel, trunk deck lid, roof panel, hood, roof and/or stringers, rivets, landing gear components, and/or skins used on an aircraft) and/or a vehicular frame. As used herein, "vehicle" or variations thereof includes, but is not limited to, civilian, commercial and military aircraft, and/or land vehicles such as cars, motorcycles, and/or trucks.

The system and method of the present invention comprise or consist essentially of or consist of a two-step conversion process suitable for treating a multi-metal article, wherein the first step comprises, consists essentially of, or consists of contacting at least a portion of the substrate surface with a zinc phosphate pretreatment composition (i.e., the first conversion composition) that does not form a pretreatment film or layer on an aluminum substrate, followed by a second step comprising, consisting essentially of, or consisting of contacting at least a portion of the substrate surface with a pretreatment composition comprising a lanthanide series metal cation (i.e., the second conversion composition) or a pretreatment composition comprising an organophosphate compound or an organophosphonate compound (i.e., the third conversion composition) that does form a film on an aluminum substrate. Notably, the level of zinc and of phosphate on the aluminum substrate surface following treatment with the first conversion composition was no different than the level of zinc and of phosphate on the substrate surface of an untreated aluminum panel as measured by X-ray fluorescence (measured using X-Met 7500, Oxford Instruments; operating parameters for phosphorous 60 second timed assay, 25 Kv, 20 µA, filter 1, T(p)=1.1 µs; operating parameters for zinc 60 second timed assay, 15 Kv, 45 µA, filter 3, T(p)=1.1 µs), indicating that the first conversion composition (i.e., zinc phosphate) did not form a pretreatment film or layer on the aluminum substrate surface. As used herein with respect to the level of zinc or phosphate on the aluminum substrate surface, the term "no different" means that the level of zinc as measured by XRF (as described above) is ±5% the peak intensity of such metals measured on an untreated panel. Accordingly, the systems and methods of the present invention permit multi-metal articles to be pretreated in the same processing line because a zinc phosphate film or layer is formed (by the first conversion composition) on non-aluminum metal substrates but not on aluminum metal substrates, while a lanthanide series metal film or layer or an organophosphate or organophosphonate film or layer is formed on the aluminum metal substrate by the second and third conversion compositions, respectively, which does not negatively affect the corrosion performance of the zinc phosphate film or layer previously formed on the non-aluminum metal substrate.

As mentioned above, the first conversion composition of the system of the present invention may comprise phosphate $(PO_4^{3-})$ ions and zinc ions, and may be substantially free of fluoride.

Phosphate ions may be present in the first conversion composition in an amount of at least 1,000 ppm based on total weight of the first conversion composition, such as at least 5,000 ppm, such as at least 10,000 ppm, and may be present in the first conversion composition in an amount of no more than 50,000 ppm based on total weight of the first conversion composition, such as no more than 30,000 ppm, such as no more than 20,000 ppm. Phosphate ions may be present in the first conversion composition in an amount of 1,000 ppm to 50,000 ppm based on total weight of the first conversion composition, such as 5,000 ppm to 30,000 ppm such as 10,000 ppm to 20,000 ppm.

The source of phosphate ions may be any material or compound known to those skilled in the art to ionize in aqueous acidic solutions to form anions such as $(PO_4)^{-3}$ from simple compounds as well as condensed phosphoric acids, including salts thereof. Nonexclusive examples of such sources include: phosphoric acid, alkali metal phosphates such as monosodium phosphate, monopotassium phosphate, disodium phosphate, divalent metal phosphates and the like, as well as mixtures thereof.

The first conversion composition of the present invention also comprises zinc ions. The zinc ions may be present in an amount of at least 300 ppm based on total weight of the first conversion composition, such as at least 500 ppm, such as at least 700 ppm, such as at least 900 ppm, such as at least 1000 ppm, and may present in the first conversion composition in an amount of no more than 3000 ppm based on total weight of the first conversion composition, such as no more than 2000 ppm, such as no more than 1750 ppm, such as no more than 1600 ppm, such as no more than 1500 ppm. The zinc ions may be present in the first conversion composition in an amount of 300 ppm to 3000 ppm based on total weight of the first conversion composition, such as 500 ppm to 2000 ppm, such as 700 ppm to 1750 ppm, such as 1000 ppm to 1500 ppm, such as 900 ppm to 1600 ppm.

The source of the zinc ion may be one or more conventional zinc ion sources known in the art, such as metallic zinc, zinc nitrate, zinc oxide, zinc carbonate, and even zinc phosphate, to the extent of solubility, and the like. With the use of the zinc phosphate, the quantitative range of the total acid may be maintained by a reduced amount of phosphate ion from the other phosphate sources. As described in more detail below, the first conversion composition may be substantially free, or essentially free, or completely free, of fluoride.

In addition to the cations described above, the first conversion composition also may contain sodium, potassium and/or ammonium ions to adjust the free acid. Free acid and total acid may be determined as described in the Examples below. The first conversion composition may have a free acid value of 0.1 points to 2 points, such as 0.5 points to 1.5 points, such as 0.7 points to 1.1 points. The first conversion composition may have a total acid value of 5 points to 40 points, such as 10 points to 30 points, such as 15 points to 24 points.

With the zinc phosphate composition bath operating within these parameters, it is possible to achieve coating weights on non-aluminum substrates that are within the specifications of the automotive industry, while preventing any significant coating from forming on the aluminum substrate during this treatment step. Thus, the multi-metal assembly, after treatment with the zinc-phosphate composition, has a coating, such as a crystalline zinc-phosphate coating, on the portion comprising the non-aluminum metal substrate that has a coating weight of at least 0.5 g/m$^2$, such as 0.5 g/m$^2$ to 10 g/m$^2$, or, in some cases, 1 g/m$^2$ to 5 g/m$^2$, but a coating, such as a continuous amorphous layer, on the portion comprising an aluminum substrate that has a coating weight no more than 0.5 g/m$^2$, such as less than 0.5 g/m$^2$, no more than 0.25 g/m$^2$, such as no more than 0.1 g/m$^2$, such as 0.05 g/m$^2$ or less.

The first conversion composition of the present invention may comprise nitrate ion and/or one or more of various metal ions, such as ferrous ion, nickel ion, cobalt ion, manganese ion, tungsten ion, and the like. For example, the first conversion composition may comprise 300-900 ppm (such as 700-900 ppm) Mn, 200-1100 ppm (such as 2:50 to 750 ppm, such as 250-500 ppm) Ni, and up to 15 ppm Fe.

Alternatively, the first conversion composition may be substantially free, or essentially free, or completely free, of nickel. When a composition and/or a layer or coating comprising the same or a system is substantially free, essentially free, or completely free of nickel, this means that nickel in any form is excluded from the composition or system, except that unintentional nickel may be present in a bath containing the composition as a result of, for example, carry-over from prior treatment baths in the processing line, nickel from a substrate, or the like. That is, a bath that is substantially free, essentially free, or completely free of nickel, may have unintentional nickel that may be derived from these external sources, even though the composition or compositions making up the system and used to make the bath prior to use on the processing line was substantially free, essentially free, or completely free of nickel.

The first conversion composition may be applied at, ambient temperature to for example, 140° F., such as 85° F. to 130° F., such as 95° F. to 125T, for 15 seconds to 4 minutes, such as 30 seconds to 2 minutes, such as 1 minute to 3 minutes, and may be followed by a water rinse, for example a 10 second to 1-minute water rinse, such as 30 seconds to 45 seconds.

The system may further comprise an activating rinse for contacting at least a portion of the surface prior to the contacting with the first conversion composition.

The metal phosphate particles of the dispersion of metal phosphate particles of divalent or trivalent metals or combinations thereof may have a $D_{90}$ particle size that is not greater than 10 μm, such as not greater than 8 μm, such as not greater than 5 μm, such as not greater than 2 μm, such as not greater than 1 μm and in some cases may be at least 0.06 μm, such as at least 0.1 μm, such as at least 0.2 μm. Particle size may be measured using an instrument such as a Mastersizer 2000, available from Malvern Instruments, Ltd., of Malvern, Worcestershire, UK, or an equivalent instrument. The Mastersizer 2000 directs a laser beam (0.633 mm diameter, 633 nm wavelength) through a dispersion of particles (in distilled, deionized or filtered water to 2-3% obscuration), and measures the light scattering of the dispersion (measurement parameters 25° C., 2200 RPM, 30 sec premeasurement delay, 10 sec background measurement, 10 sec sample measurement). The amount of light scattered by the dispersion is inversely proportional to the particle size. A series of detectors measure the scattered light and the data are then analyzed by computer software (Malvern Mastersizer 2000 software, version 5.60) to generate a particle size distribution, from which particle size can be routinely determined. The sample of dispersion of particles optionally may be sonicated prior to analysis for particle size. The sonication process comprises: (1) mixing the dispersion of particles using a Vortex mixer (Fisher Scientific Vortex Genie 2, or equivalent); (2) adding 15 mL of distilled deionized, ultra-filtered water to a 20 mL screw-cap scintillation vial; (3) adding 4 drops of the dispersion to the vial; (4) mixing the contents of the vial using the Vortex mixer; (5) capping the vial and placing it into an ultrasonic water bath (Fisher Scientific Model FS30, or equivalent) for 5 minutes; (6) vortexing the vial again; and (7) adding the sample dropwise to the Mastersizer to reach an obscuration between 2-3 for particle size distribution analysis described above.

The metal phosphate particles may be substantially pulverized, such that more than 90% of the metal phosphate particles in the activating rinse composition are pulverized, such as more than 91%, such as more than 92%, such as more than 93%, such as more than 94%, such as more than 95%, such as more than 96%, such as more than 97%, such as more than 98%, such as more than 99%. The metal phosphate particles may be completely pulverized, such that 100% of the particles are pulverized.

The metal phosphate (as total metal compound) may be present in the activating rinse in an amount of at least 50 ppm, based on total weight of the activating rinse, such as at least 150 ppm, and may be present in the activating rinse in an amount of no more than 5000 ppm, based on total weight of the activating rinse, such as no more than 1500 ppm. The metal phosphate (as total metal compound) may be present in the activating rinse in an amount of 50 ppm to 5,000 ppm of total metal phosphate based on the total weight of the activating rinse, such as of 150 ppm to 1,500 ppm.

The divalent or trivalent metal of the metal phosphate may comprise zinc, iron, calcium, manganese, aluminum, nickel, or combinations thereof. If combinations of different metal phosphates are employed, they may comprise the same or different metals, and may be selected from the particular zinc, iron, calcium, manganese and aluminum phosphates mentioned in the following. Suitable zinc phosphates useful in the activating rinse bath include, without limitation $Zn_3(PO_4)_2$, $Zn_2Fe(PO_4)_2$, $Zn_2Ca(PO_4)_2$, $Zn_2Mn(PO_4)_2$, or combinations thereof. Suitable iron phosphates useful in the activating rinse bath include, without limitation $FePO_4$, $Fe_3(PO_4)_2$, or combinations thereof. Suitable calcium phosphates useful in the activating rinse bath include, without limitation $CaHPO_4$, $Ca_3(PO_4)_2$, or combinations thereof. Suitable manganese phosphates useful in the activating rinse bath include, without limitation $Mn_3(PO_4)_2$, $MnPO_4$, or combinations thereof. Suitable aluminum phosphates useful in the activating rinse bath include, without limitation $AlPO_4$.

The activating rinse may further comprise a dispersant. The dispersant may be ionic or non-ionic. Suitable ionic dispersants useful in the activating rinse may comprise an aromatic organic acid, a phenolic compound, a phenolic resin, or combinations thereof. Suitable non-ionic dispersants useful in the activating rinse may include non-ionic polymers, in particular those comprised of monomers (or residues thereof) including propylene oxide, ethylene oxide, styrene, a monoacid such as (meth)acrylic acid, a diacid such as maleic acid or itaconic acid, an acid anhydride such as acrylic anhydride or maleic anhydride, or combinations thereof. Examples of suitable commercially available non-ionic dispersants include DISPERBYK®-190 available from BYK-Chemie GmbH and ZetaSperse® 3100 available from Air Products Chemicals Inc.

The activating rinse may be substantially free or completely free of ionic dispersants. As used herein, an activating rinse is substantially free of ionic dispersants if ionic dispersants are present in an amount less than 1% by weight, based on the total weight of the activating rinse. As used herein, an activating rinse is completely free of ionic dispersants if ionic dispersants are not present in the activating rinse, meaning 0% by weight based on the total weight of the activating rinse.

The activating rinse may include a metal sulfate salt, such as, for example, where the metal phosphate particles have a $D_{90}$ particle size of greater than 1 µm to 10 µm, or, for example, where the metal phosphate particles have a $D_{90}$ particle size of less than 1 µm. The metal of the metal sulfate may be the same as or different from the metal of the metal phosphate particles. The metal of the metal sulfate salt may comprise a divalent metal, a trivalent metal or combinations thereof, such as, for example, nickel, copper, zinc, iron, magnesium, cobalt, aluminum or combinations thereof.

When present, if at all, the sulfate ion of the metal sulfate salt may be present in the activating rinse in an amount of at least 5 ppm based on the total weight of the activating rinse, such as at least 10 ppm, such as at least 20 ppm, such as at least 50 ppm, and in some cases, no more than the solubility limit of the metal sulfate salt in the activating rinse, such as no more than 5,000 ppm, such as no more than 1,000 ppm, such as no more than 500 ppm, such as no more than 250 ppm. The sulfate ion of the metal sulfate salt may be present in an amount of 5 ppm to 5,000 ppm based on a total amount of sulfate in the metal sulfate salt, such as 10 ppm to 1,000 ppm, such as 20 ppm to 500 ppm, such as 50 ppm to 250 ppm. The activating rinse may be substantially free or completely free of sulfate ions. As used herein with respect to the sulfate ion of a metal sulfate salt, the term "substantially free" means that the sulfate ion is present in the activating rinse in an amount of less than 5 ppm based on the total weight of the activating rinse. As used herein with respect to the sulfate ion of a metal sulfate salt, the term "completely free" means that the activating rinse does not comprise a sulfate ion (i.e., there are 0 ppm of sulfate ion (based on the total weight of the activating rinse) present in the activating rinse).

The activating rinse may be substantially free, or in some cases, essentially free, or in some cases, completely free, of nickel, as described above with respect to the first conversion composition.

Alternatively, the activating rinse may comprise colloidal titanium-phosphate particles. The titanium may be present in the activating rinse may be present in an amount of 1 ppm to 6 ppm, such 2 ppm to 3.5 ppm, and the pH may be 7.5 to 10, such as 8 to 9.5.

In accordance with a method of the present invention, a substrate may be treated by (a) applying an activating rinse described above to at least a portion of the substrate, and (b) phosphatizing at least a portion the substrate with the first conversion composition. The activating rinse can be applied to the substrate by spray, roll-coating or immersion techniques. The activating rinse may typically be applied onto the substrate at a temperature ranging from 20° C. to 50° C. for any suitable period of time. After the surface of the non-aluminum substrate has been "activated", the surface of the substrate may be contacted with the first conversion composition described above.

As mentioned above, the second conversion composition may comprise a lanthanide series metal cation. At least a portion of the substrate surface may be contacted with the second conversion composition following contacting with the first conversion composition. The lanthanide series metal cation may, for example, comprise cerium, praseodymium, terbium, or combinations thereof. The lanthanide series metal cation may be present in the second conversion composition as a salt. The cation of the lanthanide series metal salt may be present in the second conversion composition in an amount of at least 5 ppm (calculated as metal cation) based on total weight of the second conversion composition, such as at least 10 ppm, such as at least 20 ppm, such as at least 30 ppm, such as at least 40 ppm, such as at least 50 ppm, and may be present in the second conversion composition in an amount of no more than 25,000 ppm (calculated as metal cation) based on total weight of the second conversion composition, such as no more than 10,000 ppm, such as no more than 5,000 ppm, such as no more than 3,000 ppm, such as no more than 1,000 ppm, such as no more than 500 ppm. The cation of the lanthanide series metal salt may be present in the second conversion composition an amount of 5 ppm to 25,000 ppm (calculated as metal cation) based on total weight of the second conversion composition, such as 10 ppm to 10,000 ppm, such as 20 ppm to 5,000 ppm, such as 30 ppm to 3,000 ppm, such as 40 ppm to 1,000 ppm, such as 50 ppm to 500 ppm. The cation of the lanthanide series metal salt may be present in the second conversion composition in an amount of 50 ppm to 500 ppm (calculated as metal cation) based on total weight of the second conversion composition.

The second conversion composition may further comprise an anion that may be suitable for forming a salt with the lanthanide series metal cation, such as a halogen, a nitrate, a sulfate, a phosphate, a silicate (orthosilicates and metasilicates), carbonates, hydroxides, and the like. In examples, the halogen may exclude fluoride, since lanthanide metal fluoride complexes are generally very insoluble in water. The anion may be present in the conversion composition, if at all, in an amount of at least 2 ppm (as anion) based on total weight of the conversion composition, such as at least 50 ppm, such as at least 150 ppm, and may be present in an amount of no more than 25,000 ppm (as anion) based on total weight of the conversion composition, such as no more than 18,500 ppm, such as no more than 5000 ppm. The anion may be present in the conversion composition, if at all, in an amount of 2 ppm to 25,000 ppm (as anion) based on total weight of the conversion composition, such as 50 ppm to 18,500 ppm, such as 150 ppm to 5000 ppm.

The second conversion composition optionally may further comprise an oxidizing agent. Non-limiting examples of the oxidizing agent include peroxides, persulfates, perchlorates, hypochlorite, nitric acid, sparged oxygen, bromates, peroxi-benzoates, ozone, or combinations thereof. The oxidizing agent may be present in an amount of at least 25 ppm, such as at least 150 ppm, such as at least 500 ppm, based on total weight of the conversion composition, and may be present in an amount of no more than 13,000 ppm, such as no more than 10,000 ppm, such as no more than 3000 ppm, based on total weight of the conversion composition. The oxidizing agent may be present in the conversion composition, if at all, in an amount of 25 ppm to 13,000 ppm, such as such as 150 ppm to 10,000 ppm, such as 500 ppm to 3000 ppm, based on total weight of the conversion composition.

The second conversion composition may exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphates, and the like, and can include, but are not limited to, monovalent, divalent, or trivalent cations such as: sodium, potassium, calcium, zinc, nickel, manganese, aluminum and/or iron. The second conversion composition may also exclude other phosphorous-containing compounds, for example, phosphonic acids or phosphonate salts. When a composition and/or a layer or coating comprising the same is substantially free, essentially free, or completely free of phosphate, this includes phosphate ions or compounds containing phosphate in any form.

Thus, the second conversion composition and/or layers deposited from the same may be substantially free, or in some cases may be essentially free, or in some cases may be completely free, of one or more of any of the ions or compounds listed in the preceding paragraph. A conversion composition and/or layers deposited from the same that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the conversion compositions and/or layers deposited from the same in such a level that they cause a burden on the environment. The term "substantially free" means that the conversion compositions and/or layers deposited from the same contain less than 5 ppm of any or all of the phosphate anions or compounds listed in the preceding paragraph, based on total weight of the composition or the layer, respectively, if any at all. The term "essentially free" means that the conversion compositions and/or layers comprising the same contain less than 1 ppm of any or all of the phosphate anions or compounds listed in the preceding paragraph. The term "completely free" means that the conversion compositions and/or layers comprising the same contain less than 1 ppb of any or all of the phosphate anions or compounds listed in the preceding paragraph, if any at all.

Optionally, the second conversion composition may contain no more than one lanthanide series metal cation, such that the second conversion composition may contain one lanthanide series metal cation, and may be substantially free or essentially free or completely free of more than one lanthanide series metal cations.

The second conversion composition may be substantially free or completely free of gelatin.

The second conversion composition may be substantially free or completely free of lanthanide oxide such that the bath containing the second conversion composition is substantially or completely free of lanthanide oxide.

The second conversion composition optionally may be substantially free, essentially free, or completely free of copper.

The pH of the second conversion composition may be 2.0 to 5.5, such as 2.5 to 4.5, such as 3 to 4, and may be adjusted using, for example, any acid and/or base as is necessary. The pH of the second conversion composition may be maintained through the inclusion of an acidic material, including water soluble and/or water dispersible acids, such as nitric acid, sulfuric acid, and/or organic acids, including by way of non-limiting examples, $C_1$-$C_6$ acids, such as formic acid, acetic acid, and/or propionic acid. The pH of the second conversion composition may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

The second conversion composition may comprise a carrier, often an aqueous medium, so that the composition is in the form of a solution or dispersion of the lanthanide series metal cation, such as the lanthanide series metal salt, in the carrier. For example, the second conversion composition may be an aqueous composition. The solution or dispersion may be brought into contact with the substrate by any of a variety of known techniques, such as dipping or immersion, spraying, intermittent spraying, dipping followed by spraying, spraying followed by dipping, brushing, or roll-coating. According to the invention, the solution or dispersion when applied to the metal substrate may be at a temperature ranging from 20° C. to 50° C., such as 25° C. to 40° C. For example, the conversion process may be carried out at ambient or room temperature. The contact time is often from 15 seconds to 5 minutes, such as 30 seconds to 4 minutes, such as 1 minute to 3 minutes.

The third conversion composition may comprise an organophosphate compound or an organophosphonate compound such as an organophosphoric acid or an organophosphonic acid. In examples, the organophosphate compound may be a phosphatized epoxy resin. In examples, the organophosphate or organophosphonate compound may be a phosphoric acid ester or a phosphonic acid ester of an epoxy compound.

Suitable phosphoric acids include, but are not limited to, phosphoric acid ester of bisphenol A diglycidyl ether. Suitable phosphonic acids are those having at least one group of the structure:

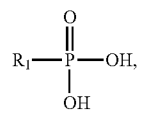

where R is C such as CH2 or O—CO—(CH2)2. Non-limiting examples include 1-hydroxyethyldiene-1,1-diphosphonic acid (HED), carboxyethyl phosphonic acid. Other examples of phosphonic acids include alkyl phosphonic acids where $R_1$ is an alkyl chain ranging from $C_1$ to $C_6$ such as methylphosphonic, ethylphosphonic acid, propylphosphonic acid, butylphosphonic acid, and/or hexylphosphonic acid. Phosphonic acids where $R_1$ is an aryl group such as phenylphosphonic acid may also be used.

Examples of alpha-aminomethylene phosphonic acids which may be utilized in the reaction with an epoxy compound to prepare a compound of the invention include:

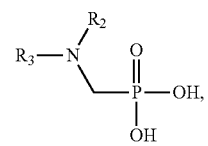

where $R_2$ is $CH_2PO_3H_2$ and $R_3$ is hydrogen or an alkyl group such as 2-hydroxyethyl, isopropyl, n-propyl, n-butyl, n-hexyl, n-octyl, isononyl, dodecyl, or benzyl. Other examples of alpha-aminomethylene phosphonic acids include examples where $R_2$ and $R_3$ are alkyl groups, such as P-[(dimethylamino)methyl] phosphonic acid and P-[(diethylamino)methyl] phosphonic acid. Other examples of alpha-aminomethylene phosphonic acids with at least three phosphonic acid per molecule include: aminotris (methylenephosphonic acid) where $R_2$ and $R_3$ are $CH_2PO_3H_2$, ethylenediaminetetrakis(methylenephosphonic acid), i.e., $(H_2O_3PCH_2)_2N(CH_2)_2N(CH_2PO_3H_2)_2$, and diethylenetriaminepentakis(methylphosphonic acid), i.e., $[(H_2O_3PCH_2)_2N(CH_2)_2]_2NCH_2PO_3H_2$.

Alpha-aminomethylene phosphonic acids are generally known compounds and can be prepared utilizing generally known methods. Many alpha-aminomethylene phosphonic acids are available commercially, for example under the Dequest product line available from Italmatch Chemicals (Genoa, Italy). One such example is aminotris(methylenephosphonic acid) is available in an aqueous solution as Dequest 2000.

Suitable epoxy compounds include, but are not limited to, 1,2-epoxy compounds having an epoxy equivalence of at least 1, such as monoepoxides having a 1,2-epoxy equivalent of 1 or polyepoxides having a 1,2-epoxy equivalent of 2 or more. Examples of such epoxy compounds include, but are not limited to, polyglycidyl ethers of polyhydric phenols such as the polyglycidyl ether of 2,2-bis(4-hydroxyphenyl) propane, i.e., bisphenol A, and 1,1-bis(4-hydroxyphenyl) isobutane, monoglycidyl ethers of a monohydric phenol or alcohol such as phenyl glycidyl ether and butyl glycidyl ether, or combinations thereof.

Suitable examples a organophosphonic or organophosphoric resins include, but are not limited to, benzylaminobis (methylenephosphonic) acid ester of bisphenol A diglycidyl ether carboxycarboxyethyl phosphonic acid ester of bisphenol A diglycidyl ether and of phenylglycidyl ether and of butyl glycidyl ether; carboxyethyl phosphonic acid mixed ester of bisphenol A diglycidyl ether and butylglycidyl ether, triethoxyl silyl propylaminobis(methylenephosphonic) acid ester of bisphenol A diglycidyl ether and cocoaminobis (methylenephosphonic) acid ester of bisphenol A diglycidyl ether.

The organophosphate or organophosphonate compound may be present in the third conversion composition in an amount of 0.5 percent by weight, based on total weight of the third conversion composition, such as 1 percent by weight, such as 5 percent by weight, and may be present in an amount of no more than 20 percent by weight, based on total weight of the third conversion composition, such as no more than 15 percent by weight. The organophosphate or organophosphonate compound may be present in the third conversion composition in an amount of 0.5 percent by weight to 20 percent by weight, based on total weight of the third conversion composition, such as 5 percent by weight to 15 percent by weight.

The third conversion composition may have a solids content of 0.25 percent, based on total weight of the third conversion composition, such as 0.5 percent, such as 2.5 percent, and may have a solids content of no more than 10 percent, based on total weight of the third conversion composition, such as no more than 7.5 percent. The third conversion composition may have a solids content of 0.25 percent to 10 percent, based on total weight of the third conversion composition, such as 2.5 percent to 7.5 percent.

The organophosphate or organophosphonate compound may be soluble in an aqueous medium (described below) to the extent of at least 0.03 grams per 100 grams of water at 25° C. The third conversion composition optionally may further comprise at least one transition metal cation. The transition metal cation may be, for example, a metal cation of Group IIIB, Group IVB, Group VB, Group VIB, Group VIIB, and/or Group XII.

The Group IIIB metal cation may comprise yttrium, scandium, or combinations thereof. The Group IVB metal cation may comprise zirconium, titanium, hafnium, or combinations thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as zirconium acetate, zirconium oxalate, ammonium zirconium glycolate, ammonium zirconium lactate, ammonium zirconium citrate, zirconium basic carbonate, zirconium tetraalkaloids, and mixtures thereof. Suitable compounds of titanium include, but are not limited to, fluorotitanic acid and its salts. A suitable compound of hafnium includes, but is not limited to, hafnium nitrate. The Group VB metal cation may comprise vanadium. The Group VIB metal may comprise molybdenum or trivalent chrome or hexavalent chrome. The Group VIIB metal cation may comprise manganese or rhenium. The Group XII metal cation may comprise zinc.

According to the present invention, the transition metal cation(s) may be present in the third conversion composition in a total amount of at least 5 ppm metal cation(s), based on total weight of the third conversion composition, such as at least 10 ppm metal cation(s), such as at least 20 ppm metal cation(s). According to the present invention, the transition metal cation(s) may be present in the third conversion composition in a total amount of no more than 500 ppm metal cation(s), based on total weight of the third conversion composition, such as no more than 300 ppm metal cation(s), such as no more than 200 ppm metal cation(s). According to the present invention, the transition metal cation(s) may be present in the third conversion composition in a total amount of 5 ppm to 500 ppm metal cation, based on total weight of the third conversion composition, such as 10 ppm to 300 ppm, such as 20 ppm to 200 ppm. As used herein, the term "total amount," when used with respect to the amount of transition metal cations in the third conversion composition, means the sum of all transition metal cations present in the third conversion composition. Alternatively, the third conversion composition may be substantially free, or essentially free, or completely free, of transition metal cations.

The third conversion composition optionally may further comprise a halide ion, such as, for example, fluoride or chloride. Suitable sources of fluoride (defined herein below) or chloride ions include hydrofluoric acid, hydrochloric acid, fluorosilicic acid, sodium hydrogen fluoride, potassium hydrogen fluoride, ammonium salts of halides, and/or acids or salts of tetrafluoroborate. Complex fluoride containing compounds such as fluorotitanic acid, fluorozirconic acid, potassium hexafluorotitanate and potassium hexafluorozirconate can also be used. The acidic fluoride or chloride compounds may be present in the third conversion composition in amounts of at least 300 ppm based on total weight of the third composition, such as at least 400 ppm, such as at least 500 ppm, such as at least 800 ppm, and may be present in an amount of no more than 3500 ppm based on total weight of the third composition, such as no more than 2000 ppm, such as no more than 1500 ppm, such as no more than 1200 ppm. The acidic fluoride or chloride compounds may be present in the third conversion composition in amounts of 300 ppm to 3500 ppm based on total weight of the third conversion composition, such as 400 ppm to 2000 ppm, such as 500 ppm to 1500 ppm, such as 800 ppm to 1200 ppm.

The free fluoride (as defined herein below) of the third conversion composition may be present in an amount of at least 15 ppm, based on a total weight of the third conversion composition, such as at least 50 ppm free fluoride, such as at least 100 ppm free fluoride, such as at least 200 ppm free fluoride. According to the present invention, the free fluoride of the third conversion composition may be present in an amount of no more than 2500 ppm, based on a total weight of the third conversion composition, such as no more than 1000 ppm free fluoride, such as no more than 750 ppm free fluoride, such as no more than 250 ppm free fluoride. According to the present invention, the free fluoride of the third conversion composition may be present in an amount of 15 ppm free fluoride to 2500 ppm free fluoride, based on a total weight of the third conversion composition, such as 50 ppm fluoride to 1000 ppm, such as no more than 200 ppm free fluoride to 750 ppm free fluoride, such as 100 ppm free fluoride to 250 ppm free fluoride.

The third conversion composition may further comprise a foam depressor, including by way of non-limiting example Foam Depressor 304 CK (commercially available from PPG Industries, Inc.). Those skilled in the art of pretreatment technologies understand that foam in a pretreatment bath may have a negative impact on substrate wetting and the appearance or quality of a film formed by a pretreatment composition. Accordingly, foam depressors may be added to a cleaning and pretreatment compositions to prevent the formation of foam or to break foam already present, particularly in spray applications. Defoaming surfactants may optionally be present at levels up to 1 weight percent, such as up to 0.1 percent by weight, and wetting agents are typically present at levels up to 2 percent, such as up to 0.5 percent by weight, based on the total weight of the first, second, or third conversion composition, as the case may be.

The third conversion composition may optionally be substantially free, essentially free, or completely free of copper.

The third conversion composition may have a pH of less than 6, such as 2 to such as 2.5 to 5.5, and may be adjusted using, for example, any acid and/or base as is necessary. The pH of the third conversion composition may be maintained through the inclusion of an acidic material, including water soluble and/or water dispersible acids, such as nitric acid, sulfuric acid, and/or phosphoric acid. The pH of the third conversion composition may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

The third conversion composition may be an aqueous composition. The solution or dispersion of the third conversion composition may be brought into contact with the substrate by any of a variety of known techniques, such as dipping or immersion, spraying, intermittent spraying, dipping followed by spraying, spraying followed by dipping, brushing, or roll-coating. According to the invention, the solution or dispersion when applied to the metal substrate may be at a temperature ranging from 15° C. to 85° C., such as 20 C to 60 C. For example, the conversion process may be carried out at ambient or room temperature. The contact time is often from 5 seconds to 5 minutes, such as 15 seconds to 4 minutes, such as 30 seconds to 3 minutes.

The first conversion composition, the second conversion composition, the third conversion composition, and/or the system may exclude fluoride or fluoride sources. As used herein, "fluoride sources" include monofluorides, bifluorides, fluoride complexes, and mixtures thereof known to generate fluoride ions. When a composition and/or a layer or coating comprising the same or a system is substantially free, essentially free, or completely free of fluoride, this means that fluoride ions or fluoride sources in any form are excluded from the composition or system, except that unintentional fluoride that may be present in a composition or bath containing the composition as a result of, for example, carry-over from prior treatment baths in the processing line, municipal water sources (e.g.: fluoride added to water supplies to prevent tooth decay), fluoride from a pretreated substrate, or the like. That is, a bath that is substantially free, essentially free, or completely free of fluoride, may have unintentional fluoride that may be derived from these external sources, even though the composition or compositions making up the system and used to make the bath prior to use on the processing line was substantially free, essentially free, or completely free of fluoride.

For example, the first conversion composition, the second conversion composition, the third conversion composition, and/or the compositions making up the system may be substantially free of any fluoride-sources, such as ammonium and alkali metal fluorides, acid fluorides, fluoroboric, fluorosilicic, fluorotitanic, and fluorozirconic acids and their ammonium and alkali metal salts, and other inorganic fluorides, nonexclusive examples of which are: zinc fluoride, zinc aluminum fluoride, titanium fluoride, zirconium fluoride, nickel fluoride, ammonium fluoride, sodium fluoride, potassium fluoride, and hydrofluoric acid, as well as other similar materials known to those skilled in the art.

Fluoride present in the first, second, and/or third conversion compositions that is not bound to metals ions or hydrogen ion, defined herein as "free fluoride," may be measured as an operational parameter in the pretreatment composition bath using, for example, an Orion Dual Star Dual Channel Benchtop Meter equipped with a fluoride ion selective electrode ("ISE") available from Thermoscientific, the Symphony® Fluoride Ion Selective Combination Electrode supplied by VWR International, or similar electrodes. See, e.g., Light and Cappuccino, *Determination of fluoride in toothpaste using an ion-selective electrode*, J. Chem. Educ., 52:4, 247-250, April 1975. The fluoride ISE may be standardized by immersing the electrode into solutions of known fluoride concentration and recording the reading in millivolts, and then plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly.

Fluoride ion is a small negative ion with a high charge density, so in aqueous solution it is frequently complexed with metal ions having a high positive charge density or with hydrogen ion. Fluoride anions in solution that are ionically or covalently bound to metal cations or hydrogen ion are defined herein as "bound fluoride." The fluoride ions thus complexed are not measurable with the fluoride ISE unless the solution they are present in is mixed with an ionic strength adjustment buffer (e.g.: citrate anion or EDTA) that releases the fluoride ions from such complexes. At that point (all of) the fluoride ions are measurable by the fluoride ISE, and the measurement is known as "total fluoride". Alternatively, the total fluoride can be calculated by comparing the weight of the fluoride supplied in the conversion composition by the total weight of the conversion composition.

Compositions containing fluoride present both user hazards and challenges in the pretreatment process. The hazards associated with fluoride added to a conversion composition include toxicity (e.g.: ingestion of 50 ppm of fluoride can result in death) and deleterious health effects (e.g.: 2-3 ppm of fluoride present in drinking water can cause brown mottling of teeth and fluoride absorbed through the skin can cause bone damage via calcium loss). Elevated levels of fluoride present in the conversion composition function to solubilize metal ions comprising the pretreatment compositions, thus inhibiting effective deposition of the pretreatment film. In the case of Group IVB metal ion conversion compositions, fluoride functions to solubilize the Group IVB metal ions, where high levels of free fluoride inhibit deposition of the conversion coating. In the deposition process of zinc phosphate on aluminum, the presence of fluoride is required to remove the native aluminum oxide, thus enabling pretreatment of the substrate. However, multimetal vehicle constructions with high aluminum content (greater than 20%) rapidly form insoluble cryolite ($Na_3AlF_6$) and elpasolite ($K_2NaAlF_6$), which inhibit effective pretreatment of aluminum substrates with zinc phosphate. Given the health and process challenges (especially on aluminum) associated with fluoride-containing conversion compositions, conversion compositions free of fluoride are an important invention which fulfill an unmet need.

Thus, first conversion composition and/or layers deposited from the same, second conversion composition and/or layers deposited from the same, third conversion composition and/or layers deposited from the same, and/or the system and/or layers deposited as a result of using the system may be substantially free, or in some cases may be essentially free, or in some cases may be completely free, of one or more of any of the ions or compounds listed in the preceding paragraph. A conversion composition and/or layers deposited from the same and/or a system and/or layers deposited as a result of using the system that is substantially free of fluoride means that fluoride ions or compounds containing fluoride are not intentionally added, but may be present in trace amounts, such as because of impurities or unavoidable contamination from the environment. In other words, the amount of material is so small that it does not affect the properties of the composition; this may further include that fluoride is not present in the sealing compositions and/or layers deposited from the same in such a level that they cause a burden on the environment. The term "substantially free" means that the conversion compositions and/or layers deposited from the and/or a system or layers deposited as a result of using the system same contain less than 5 ppm of any or all of the fluoride anions or compounds listed in the preceding paragraph, based on total weight of the composition or the layer if any at all. The term "essentially free" means that the conversion compositions and/or layers comprising the same and/or the system and/or layers deposited as a result of using the system contain less than 1 ppm of any or all of the fluoride anions or compounds listed in the preceding paragraph. The term "completely free" means that the conversion compositions and/or layers comprising the same and/or the system and/or layers deposited as a result of using the system contain less than 1 ppb of any or all of the fluoride anions or compounds listed in the preceding paragraph, if any at all.

The first conversion composition and/or the second conversion composition and/or the third conversion composition may optionally contain other materials in addition to those described above, such as nonionic surfactants and auxiliaries conventionally used in the art of pretreatment. In an aqueous medium, water dispersible organic solvents, for example, alcohols with up to about S carbon atoms, such as methanol, isopropanol, 1-methoxy-2-propanol, and the like, may be present; or glycol ethers such as the monoalkyl ethers of ethylene glycol, diethylene glycol, or propylene glycol, and the like; dimethylformamide; xylene; a base such as an amine which can partially or completely neutralize the organophosphate or organophosphonate compound to enhance the solubility of the organophosphate or organophosphonate compounds, such as diisopropanolamine, triethyl amine, dimethylethanol amine, and 2-amino-2-methylpropanol; and combinations thereof. When present, water dispersible organic solvents are typically used in amounts up to about ten percent by volume, based on the total volume of the first conversion composition or second conversion composition, as the case may be. Other optional materials include surfactants that function as defoamers or substrate wetting agents. Anionic, cationic, amphoteric, and/or nonionic surfactants may be used.

The first conversion composition and/or second conversion composition and/or third conversion composition optionally may comprise a reaction accelerator, such as nitrite ions, nitrate ions, nitro-group containing compounds, hydroxylamine sulfate, persulfate ions, sulfite ions, hyposulfite ions, peroxides, iron (III) ions, citric acid iron compounds, bromate ions, perchlorinate ions, chlorate ions, chlorite ions as well as ascorbic acid, citric acid, tartaric acid, malonic acid, succinic acid and salts thereof.

The first conversion composition and/or second conversion composition may comprise a resinous binder. Suitable resins may include, for example, reaction products of one or more alkanolamines and an epoxy-functional material containing at least two epoxy groups. In some cases, such resins contain beta hydroxy ester, imide, or sulfide functionality. Alternatively, the reaction product may be that of the diglycidyl ether of Bisphenol A (commercially available from Shell Chemical Company as EPON 828 OR 1031), dimethylol propionic acid, and diethanolamine. Other suitable resinous binders include water soluble and water dispersible polyacrylic acids; water soluble polyamides; copolymers of maleic or acrylic acid with allyl ether; and water soluble and dispersible resins including epoxy resins, aminoplasts, phenol-formaldehyde resins, tannins, and polyvinyl phenols. The resinous binder may be present in the first conversion composition and/or second conversion composition, if at all, in an amount of 0.005 percent to 30 percent by weight, such as 0.5 to 3 percent by weight, based on the total weight of the ingredients in the respective composition.

Alternatively, the first conversion composition and/or second conversion composition may be substantially free or, in some cases, completely free of any resinous binder. As used herein, the term "substantially free", when used with reference to the absence of resinous binder in a conversion composition, means that any resinous binder is present in the composition in an amount of less than 0.005 percent by weight. As used herein, the term "completely free" means that there is no resinous binder in the conversion composition at all.

The first and/or second and/or third conversion composition and/or the system may exclude chromium or chromium-containing compounds. As used herein, the term "chromium-containing compound" refers to materials that include hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When a conversion composition and/or a coating or a layer formed from the same, or a system, is substantially free, essentially free, or completely free of chromium, this includes chromium in any form, such as, but not limited to, the hexavalent chromium-containing compounds listed above.

Thus, optionally, the first and/or second and/or third conversion compositions and/or coatings or layers deposited from the same, and/or the system, may be substantially free, may be essentially free, and/or may be completely free of one or more of any of the elements or compounds listed in the preceding paragraph. A conversion composition and/or coating or layer formed from the same and/or a system that is substantially free of chromium or derivatives thereof means that chromium or derivatives thereof are not intentionally added, but may be present in trace amounts, such as because of impurities or unavoidable contamination from the environment. In other words, the amount of material is so small that it does not affect the properties of the conversion composition or the system; in the case of chromium, this may further include that the element or compounds thereof are not present in the conversion composition and/or coatings or layers formed from the same and/or system in such a level that it causes a burden on the environment. The term "substantially free," when used herein with respect to a conversion composition, means that the composition and/or coatings or layers formed from the same contain less than 10 ppm of any or all of the elements or compounds listed in the preceding paragraph, based on total weight of the composition or the coating or layer, respectively, if any at all. The term "essentially free," when used herein with respect to a conversion composition, means that the conversion composition and/or coatings or layers formed from the same contain less than 1 ppm of any or all of the elements or compounds listed in the preceding paragraph, if any at all. The term "completely free," when used herein with respect to a conversion composition, means that the conversion composition and/or coatings or layers formed from the same contain less than 1 ppb of any or all of the elements or compounds listed in the preceding paragraph, if any at all. The term "substantially free," when used herein with respect to the system, means that each composition comprising the system and/or coatings or layers formed from each such composition contain less than 10 ppm of any or all of the elements or compounds listed in the preceding paragraph, based on total weight of the composition or the coating or layer, respectively, if any at all. The term "essentially free," when used herein with respect to the system, means that each composition comprising the system and/or coatings or layers formed from each such composition contain less than 1 ppm of any or all of the elements or compounds listed in the preceding paragraph, if any at all. The term "completely free," when used herein with respect to the system, means that each composition comprising the system and/or coatings or layers formed from each such composition contain less than 1 ppb of any or all of the elements or compounds listed in the preceding paragraph, if any at all.

Optionally, the first conversion composition and/or second conversion composition may be substantially free, or, in some cases, completely free of any organic materials. As used herein, the term "substantially free", when used with reference to the absence of organic materials in a composition, means that any organic materials are present in the composition, if at all, as an incidental impurity. In other words, the presence of any organic material does not affect the properties of the composition. As used herein, the term "completely free", when used with reference to the absence of organic material, means that there is no organic material in the composition at all.

Optionally, the first conversion composition and/or second conversion composition and/or third conversion composition and/or the system may be substantially free, or, in some cases, essentially free, or in some cases, completely free of any Group IVB metal cations At least a portion of the substrate surface may be cleaned and/or deoxidized prior to contacting at least a portion of the substrate surface with a conversion composition described above, in order to remove grease, dirt, and/or other extraneous matter. At least a portion of the surface of the substrate may be cleaned by physical and/or chemical means, such as mechanically abrading the surface and/or cleaning/degreasing the surface with commercially available alkaline or acidic cleaning agents that are well known to those skilled in the art. Examples of alkaline cleaners suitable for use in the present invention include Chemkleen™ 166HP, 166M/C, 177, 490MX, 2010LP, and Surface Prep 1 (SP1), Ultrax 32, Ultrax 97, Ultrax 29, and Ultrax92D, each of which are commercially available from PPG Industries, Inc. (Cleveland, Ohio), and any of the DFM Series, RECC 1001, and 88X1002 cleaners commercially available from PRC-DeSoto International, Sylmar, Calif.), and Turco 4215-NCLT and Ridolene (commercially available from Henkel Technologies, Madison Heights, Mich.). Such cleaners are often preceded or followed by a water rinse, such as with tap water, distilled water, or combinations thereof.

As mentioned above, at least a portion of the cleaned substrate surface may be deoxidized, mechanically and/or chemically. As used herein, the term "deoxidize" means removal of the oxide layer found on the surface of the substrate in order to promote uniform deposition of the conversion composition, as well as to promote the adhesion of the conversion composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, fluorosilicic acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating. The skilled artisan will select a temperature range of the solution or dispersion, when applied to the metal substrate, based on etch rates, for example, at a temperature ranging from 50° F. to 150° F. (10° C. to 66° C.), such as from 70° F. to 130° F. (21° C. to 54° C.), such as from 80° F. to 120° F. (27° C. to 49° C.). The contact time may be from 30 seconds to 20 minutes, such as 1 minute to 15 minutes, such as 90 seconds to 12 minutes, such as 3 minutes to 9 minutes.

Following the cleaning and/or deoxidizing step(s), the substrate optionally may be rinsed with tap water, deionized water, and/or an aqueous solution of rinsing agents in order to remove any residue. The wet substrate surface may be treated with a conversion composition (described above), or the substrate may be dried prior to treating the substrate surface, such as air dried, for example, by using an air knife, by flashing off the water by brief exposure of the substrate to a high temperature, such as 15° C. to 100° C., such as 20°

C. to 90° C., or in a heater assembly using, for example, infrared heat, such as for 10 minutes at 70° C., or by passing the substrate between squeegee rolls.

Following the contacting with a conversion composition, the substrate optionally may be air dried at room temperature or may be dried with hot air, for example, by using an air knife, by flashing off the water by brief exposure of the substrate to a high temperature, such as by drying the substrate in an oven at 15° C. to 200° C. or in a heater assembly using, for example, infrared heat, such as for 10 minutes at 70° C., or by passing the substrate between squeegee rolls. Following the contacting with a conversion composition, the substrate optionally may be rinsed with tap water, deionized water, and/or an aqueous solution of rinsing agents in order to remove any residue and then optionally may be dried, for example air dried or dried with hot air as described in the preceding sentence, "such as by drying the substrate in an oven at 15° C. to 100° C., such as 20° C. to 90° C., or in a heater assembly using, for example, infrared heat, such as for 10 minutes at 70° C., or by passing the substrate between squeegee rolls. Following the contacting with a conversion composition, and any optional rinsing stages, a coating composition comprising a film-forming resin may be deposited onto at least a portion of the surface of the wet substrate by any suitable technique, including, for example, brushing, dipping, flow coating, spraying and the like.

Disclosed herein is a method of treating a substrate, comprising, or consisting essentially of, or contacting at least a portion of a surface of the article with a first conversion composition comprising phosphate ions and zinc ions, wherein the first conversion composition is substantially free of fluoride; and contacting at least a portion of the contacted surface with a second conversion composition comprising a lanthanide series metal cation and an oxidizing agent; and/or contacting at least a portion of the contacted surface with a third conversion composition comprising an organophosphate compound and/or an organophosphonate compound.

Disclosed herein is a substrate comprising, or consisting essentially of, or consisting of: a film formed from a conversion composition comprising, or consisting essentially of, or consisting of, a lanthanide series metal cation and an oxidizing agent, wherein the level of the lanthanide series metal cation in the film is at least 100 counts greater than on a surface of a substrate that does not have the film thereon (i.e., a clean-only substrate) as measured by X-ray fluorescence (60 second timed assay, 15 Kv, 45 μA, filter 3, T(p)=1.5 μs).

The film formed on the substrate surface by contacting the surface with the second conversion composition may have a level of lanthanide series metal cation in the film formed on the substrate surface by the second conversion composition that is at least 100 counts greater than on a surface of a substrate that does not have the film thereon as measured by X-ray fluorescence (60 second timed assay, 15 Kv, 45 μA, filter 3, T(p)=1.5 μs). For example, the lanthanide series metal cation may be present in the film formed on the substrate surface, as shown by counts of greater than 250 counts, such as greater than 500 counts, such as greater than 1000 counts, such as greater than 1200 counts, such as greater than 1500 counts, such as greater than 2500 counts, as measured by X-ray fluorescence (60 second timed assay, 15 Kv, 45 μA, filter 3, T(p)=1.5 μs).

The film formed on the substrate surface by contacting the surface with the second conversion composition following contacting the surface with the first conversion composition may have a level of lanthanide series metal cation in the film formed on the substrate surface by the second conversion composition that is at least 100 counts greater than on a surface of a substrate that does not have the film thereon as measured by X-ray fluorescence (60 second timed assay, 15 Kv, 45 μA, filter 3, T(p)=1.5 μs). For example, the lanthanide series metal cation may be present in the film formed on the substrate surface, as shown by counts of greater than 250 counts, such as greater than 500 counts, as measured by X-ray fluorescence (60 second timed assay, 15 Kv, 45 μA, filter 3, T(p)=1.5 μs).

The substrate having the film formed on the substrate by contacting the surface with the second conversion composition following contacting the surface with the first conversion composition maintains corrosions performance (i.e., scribe creep) on the substrate surface compared to a substrate pretreated with a fluoride-containing zinc phosphate pretreatment composition (ASTM-B 368-09 Copper Acetic Acid Salt Spray, 240 hours). This was a surprising result.

It has been surprisingly discovered that the system and method of the present invention result in coating weights on non-aluminum substrates that are within the specifications of the automotive industry, while preventing any significant coating from forming on the aluminum substrate during this treatment step. Thus, the multi-metal assembly, after treatment with the fluoride-free zinc-phosphate composition (the first conversion composition), has a coating, such as a crystalline zinc-phosphate coating, on the portion comprising the non-aluminum metal substrate that has a coating weight of at least 0.5 g/m$^2$, such as 0.5 g/m$^2$ to 10 g/m$^2$, or, in some cases, 1 g/m$^2$ to 5 g/m$^2$, but a coating, such as a continuous amorphous layer formed from deposition of the lanthanide series metal cation, on the portion comprising an aluminum substrate that has a coating weight of no more than 0.5 g/m$^2$, such as less than 0.5 g/m$^2$, no more than 0.25 g/m$^2$, such as no more than 0.1 g/m$^2$, such as 0.05 g/m$^2$ or less.

Furthermore, it has been surprisingly discovered that on an aluminum substrate the b* value and YI-E313 value of panels treated with a fluoride-free zinc phosphate conversion composition (i.e., the first and second conversion compositions of the present invention) followed by a cerium-containing conversion composition were significantly lower than panels treated with only a cerium-containing conversion composition or a fluoride-containing zinc phosphate composition. These results demonstrate that the treatment of aluminum substrate with the fluoride-free zinc phosphate conversion composition of the present invention followed by the cerium-containing conversion composition of the present invention resulted in less yellow coloration of panels. These results were unexpected.

Color measurements can be determined for panels treated with the first conversion composition and the second conversion composition to characterize the degree of yellowing of the pretreated substrate. Color parameters are determined using an Xrite Ci7800 Benchtop Sphere Spectrophotometer, 25 mm aperture available from X-Rite, Incorporated, Grandville, Mich. or such similar instruments. The Xrite Ci7800 instrument measures according to the L*a*b* color space theory. The term b* indicates a more yellow hue for positive values and a more blue hue for negative values. The term a* indicates a more green hue when negative and a more red hue when positive. The term L* indicates a black hue when L*=0 and a white hue when L*=100. Spectral reflectance is excluded (SCE mode) in these measurements.

Substrates treated with a cerium-only composition have b* values that typically range from 9 to 15. Substrates treated with a zinc phosphate and optionally a cerium containing composition have a b* value that ranges from 1.5 to 4.0. Application of a heating step such as the one described herein was found to significantly reduce the b* value of substrate contacted with a cerium-containing composition. Substrate contacted with a zinc phosphate composition and/or a cerium composition that have been heat treated as described herein have a b* value that ranges from −20 to +8, such −15 to +5, such as −10 to +4, such as −5 to +2.5. The YI-E313 (yellow index) of such treated substrates as determined by ASTM E313-00 ranges from −1 to +22 prior to heating and after heat treatment ranges from −0.5 to +10, such −0.3 to +−8, such as −0.1 to 5.

The effect of heating a panel after contacting with the first and/or second conversion composition has minimal effect on the values of a* and L*. Values for a*, regardless of heat treatment range from −15 to +15, such as −10 to +10, such as −5 to +5. L* values, regardless of heat treatment range from 50 to 90, such as 60 to 80.

Furthermore, it has been surprisingly discovered that heating of pre-treated aluminum substrate further reduces the yellow coloration of substrate pretreated with the cerium-containing conversion composition of the present invention compared to unheated panels pretreated with the same conversion composition. These results were also unexpected.

It also has been surprisingly discovered that an electrocoated non-aluminum panel pretreated with a fluoride-free zinc phosphate conversion composition followed by a conversion composition comprising cerium (i.e., the system and method of the present invention) results in at least a 12% reduction in the scribe creep following 30 days exposure to GMW 14872 cyclic corrosion testing (30 day cycle) compared to an electrocoated panel pretreated with a zirconium-containing conversion composition, such as at least a 20% reduction, such as at least a 30% reduction, such as at least a 40% reduction, such as at least a 50% reduction. This result was unexpected.

It also has been surprisingly discovered that an electrocoated panel pretreated with a fluoride-free zinc phosphate conversion composition followed by a conversion composition comprising cerium results in at least a 16% reduction in the scribe creep following 30 days exposure to GMW 14872 cyclic corrosion testing (30 day cycle) compared to an electrocoated panel pretreated with a fluoride-containing zinc phosphate conversion composition, such as at least a 20% reduction, such as at least a 30% reduction, such as at least a 40% reduction, such as at least a 50% reduction. This result was unexpected.

As noted above, optionally, the second and/or third conversion compositions may be substantially free, essentially free, or completely free of copper. Copper is a common additive to thin-film pretreatment compositions to facilitate deposition on ferrous-containing substrates, but inclusion of copper in such pretreatment compositions can lead to yellowing of cured electrocoat films applied to such pretreated substrates. The ability to protect substrates with the second and/or third compositions of the present invention in the absence of copper is significant to improving the appearance of substrates treated according to the systems and methods of the present invention.

After the substrate is contacted with the second conversion composition and/or the third conversion composition, a coating composition comprising a film-forming resin may be deposited onto at least a portion of the surface of the substrate that has been contacted with the second conversion composition. Any suitable technique may be used to deposit such a coating composition onto the substrate, including, for example, brushing, dipping, flow coating, spraying and the like. Optionally, however, as described in more detail below, such depositing of a coating composition may comprise an electrocoating step wherein an electrodepositable composition is deposited onto a metal substrate by electrodeposition. In certain other instances, as described in more detail below, such depositing of a coating composition comprises a powder coating step. In still other instances, the coating composition may be a liquid coating composition.

The coating composition may comprise a thermosetting film-forming resin or a thermoplastic film-forming resin. As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. As used herein, the term "thermoplastic" refers to resins that comprise polymeric components that are not joined by covalent bonds and thereby can undergo liquid flow upon heating and are soluble in solvents.

As previously indicated, an electrodepositable coating composition comprising a water-dispersible, ionic salt group-containing film-forming resin that may be deposited onto the substrate by an electrocoating step wherein the electrodepositable coating composition is deposited onto the metal substrate by electrodeposition. The ionic salt group-containing film-forming polymer may comprise a cationic salt group containing film-forming polymer for use in a cationic electrodepositable coating composition. As used herein, the term "cationic salt group-containing film-forming polymer" refers to polymers that include at least partially neutralized cationic groups, such as sulfonium groups and ammonium groups, that impart a positive charge. The cationic salt group-containing film-forming polymer may comprise active hydrogen functional groups, including, for example, hydroxyl groups, primary or secondary amine groups, and thiol groups. Cationic salt group-containing film-forming polymers that comprise active hydrogen functional groups may be referred to as active hydrogen-containing, cationic salt group-containing film-forming polymers. Examples of polymers that are suitable for use as the cationic salt group-containing film-forming polymer include, but are not limited to, alkyd polymers, acrylics, polyepoxides, polyamides, polyurethanes, polyureas, polyethers, and polyesters, among others. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition. As used herein, the "resin solids" include the ionic salt group-containing film-forming polymer, curing agent, and any additional water-dispersible non-pigmented component(s) present in the electrodepositable coating composition.

Alternatively, the ionic salt group containing film-forming polymer may comprise an anionic salt group containing film-forming polymer for use in an anionic electrodepositable coating composition. As used herein, the term "anionic salt group containing film-forming polymer" refers to an anionic polymer comprising at least partially neutralized anionic functional groups, such as carboxylic acid and phosphoric acid groups that impart a negative charge. The anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers. The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

The electrodepositable coating composition may further comprise a curing agent. The curing agent may react with the reactive groups, such as active hydrogen groups, of the ionic salt group-containing film-forming polymer to effectuate cure of the coating composition to form a coating. Non-limiting examples of suitable curing agents are at least partially blocked polyisocyanates, aminoplast resins and phenoplast resins, such as phenolformaldehyde condensates including allyl ether derivatives thereof. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition. Alternatively, the curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

The electrodepositable coating composition may further comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof.

The electrodepositable coating composition may comprise water and/or one or more organic solvent(s). Water can for example be present in amounts of 40% to 90% by weight, such as 50% to 75% by weight, based on total weight of the electrodepositable coating composition. If used, the organic solvents may typically be present in an amount of less than 10% by weight, such as less than 5% by weight, based on total weight of the electrodepositable coating composition. The electrodepositable coating composition may in particular be provided in the form of an aqueous dispersion. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 15 minutes.

The cationic electrodepositable coating composition may be deposited upon an electrically conductive substrate by placing the composition in contact with an electrically conductive cathode and an electrically conductive anode, with the surface to be coated being the cathode. Alternatively, the anionic electrodepositable coating composition may be deposited upon an electrically conductive substrate by placing the composition in contact with an electrically conductive cathode and an electrically conductive anode, with the surface to be coated being the anode. An adherent film of the electrodepositable coating composition is deposited in a substantially continuous manner on the cathode or anode, respectively, when a sufficient voltage is impressed between the electrodes. The applied voltage may be varied and can be, for example, as low as one volt to as high as several thousand volts, such as between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

Once the cationic or anionic electrodepositable coating composition is electrodeposited over at least a portion of the electroconductive substrate, the coated substrate may be heated to a temperature and for a time sufficient to cure the electrodeposited coating on the substrate. For cationic electrodeposition, the coated substrate may be heated to a temperature ranging from 110° C. to 232.2° C., such as from 275° F. to 400° F. (135° C. to 204.4° C.), such as from 300° F. to 360° F. (149° C. to 180° C.). For anionic electrodeposition, the coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.), such as 200° F. to 210.2° F. (93° C. to 99° C.). The curing time may be dependent upon the curing temperature as well as other variables, for example, the film thickness of the electrodeposited coating, level and type of catalyst present in the composition and the like. For example, the curing time can range from 10 minutes to 60 minutes, such as 20 to 40 minutes. The thickness of the resultant cured electrodeposited coating may range from 10 to 50 microns.

Alternatively, as mentioned above, after the substrate has been contacted with second conversion composition, a powder coating composition may then be deposited onto at least a portion of the converted substrate surface. As used herein, "powder coating composition" refers to a coating composition which is completely free of water and/or solvent. Accordingly, the powder coating composition disclosed herein is not synonymous to waterborne and/or solvent-borne coating compositions known in the art. The powder coating composition may comprise (a) a film forming polymer having a reactive functional group; and (b) a curing agent that is reactive with the functional group. Examples of powder coating compositions that may be used in the present invention include the polyester-based ENVIROCRON line of powder coating compositions (commercially available from PPG Industries, Inc.) or epoxy-polyester hybrid powder coating compositions. Alternative examples of powder coating compositions that may be used in the present invention include low temperature cure thermosetting powder coating compositions comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,470,752, assigned to PPG Industries, Inc. and incorporated herein by reference); curable powder coating compositions generally comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,432,333, assigned to PPG Industries, Inc. and incorporated herein by reference); and those comprising a solid particulate mixture of a reactive group-containing polymer having a $T_g$ of at least 30° C. (such as those described in U.S. Pat. No. 6,797,387, assigned to PPG Industries, Inc. and incorporated herein by reference). After deposition of the powder coating composition, the coating is often heated to cure the deposited composition. The heating or curing operation is often carried out at a temperature in the range of from 130° C. to 220° C., such as from 170° C. to 190° C., for a period of time ranging from 10 minutes to 30 minutes, such 15 minutes to 25 minutes. According to the invention, the thickness of the resultant film is from 50 microns to 125 microns.

As mentioned above, after the substrate has been contacted with the sealing composition of the present invention, a liquid coating composition may then be applied or deposited onto at least a portion of the substrate surface. As used herein, "liquid coating composition" refers to a coating composition which contains a portion of water and/or solvent. Accordingly, the liquid coating composition disclosed herein is synonymous to waterborne and/or solvent-borne coating compositions known in the art.

The liquid coating composition may comprise, for example, (a) a film forming polymer having a reactive functional group; and (b) a curing agent that is reactive with the functional group. In other examples, the liquid coating may contain a film forming polymer that may react with oxygen in the air or coalesce into a film with the evaporation of water and/or solvents. These film-forming mechanisms may require or be accelerated by the application of heat or some type of radiation such as Ultraviolet or Infrared. Examples of liquid coating compositions that may be used in the present invention include the SPECTRACRON® line of solvent-based coating compositions, the AQUACRON® line of water-based coating compositions, and the RAYCRON® line of UV cured coatings (all commercially available from PPG Industries, Inc.). Suitable film forming polymers that may be used in the liquid coating composition of the present invention may comprise a (poly)ester, an alkyd, a (poly)urethane, an isocyanurate, a (poly)urea, a (poly)epoxy, an anhydride, an acrylic, a (poly)ether, a (poly)sulfide, a (poly)amine, a (poly)amide, (poly)vinyl chloride, (poly)olefin, (poly)vinylidene fluoride, (poly)siloxane, or combinations thereof.

The substrate that has been contacted with the second conversion composition may also be contacted with a primer composition and/or a topcoat composition. The primer coat may be, for examples, chromate-based primers and advanced performance topcoats. The primer coat can be a conventional chromate-based primer coat, such as those available from PPG Industries, Inc. (product code 44GN072), or a chrome-free primer such as those available from PPG (DESOPRIME CA7502, DESOPRIME CA7521, Deft 02GN083, Deft 02GN084). Alternately, the primer coat can be a chromate-free primer coat, such as the coating compositions described in U.S. patent application Ser. No. 10/758,973, titled "CORROSION RESISTANT COATINGS CONTAINING CARBON", and U.S. patent application Ser. No. 10/758,972, titled "CORROSION RESISTANT COATINGS", both of which are incorporated herein by reference, and other chrome-free primers that are known in the art, and which can pass the military requirement of MIL-PRF-85582 Class N or MIL-PRF-23377 Class N may also be used with the current invention.

As mentioned above, the substrate of the present invention also may comprise a topcoat. As used herein, the term "topcoat" refers to a mixture of binder(s) which can be an organic or inorganic based polymer or a blend of polymers, typically at least one pigment, can optionally contain at least one solvent or mixture of solvents, and can optionally contain at least one curing agent. A topcoat is typically the coating layer in a single or multi-layer coating system whose outer surface is exposed to the atmosphere or environment, and its inner surface is in contact with another coating layer or polymeric substrate. Examples of suitable topcoats include those conforming to MIL-PRF-85285D, such as those available from PPG (Deft 03W127A and Deft 03GY292). The topcoat may be an advanced performance topcoat, such as those available from PPG (Defthane® ELT™ 99GY001 and 99W009). However, other topcoats and advanced performance topcoats can be used in the present invention as will be understood by those of skill in the art with reference to this disclosure.

The metal substrate also may comprise a self-priming topcoat, or an enhanced self-priming topcoat. The term "self-priming topcoat", also referred to as a "direct to substrate" or "direct to metal" coating, refers to a mixture of a binder(s), which can be an organic or inorganic based polymer or blend of polymers, typically at least one pigment, can optionally contain at least one solvent or mixture of solvents, and can optionally contain at least one curing agent. The term "enhanced self-priming topcoat", also referred to as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. Examples of self-priming topcoats include those that conform to TT-P-2756A. Examples of self-priming topcoats include those available from PPG (03W169 and 03GY369), and examples of enhanced self-priming topcoats include Defthane® ELT™/ESPT and product code number 97GY121, available from PPG. However, other self-priming topcoats and enhanced self-priming topcoats can be used in the coating system as will be understood by those of skill in the art with reference to this disclosure.

The self-priming topcoat and enhanced self-priming topcoat may be applied directly to the converted or pretreated substrate. The self-priming topcoat and enhanced self-priming topcoat can optionally be applied to an organic or inorganic polymeric coating, such as a primer or paint film. The self-priming topcoat layer and enhanced self-priming topcoat is typically the coating layer in a single or multi-layer coating system where the outer surface of the coating is exposed to the atmosphere or environment, and the inner surface of the coating is typically in contact with the substrate or optional polymer coating or primer.

The topcoat, self-priming topcoat, and enhanced self-priming topcoat can be applied to the converted or pretreated substrate, in either a wet or "not fully cured" condition that dries or cures over time, that is, solvent evaporates and/or there is a chemical reaction. The coatings can dry or cure either naturally or by accelerated means for example, an ultraviolet light cured system to form a film or "cured" paint. The coatings can also be applied in a semi or fully cured state, such as an adhesive.

In addition, a colorant and, if desired, various additives such as surfactants, wetting agents or catalyst can be included in the coating composition (electrodepositable, powder, or liquid). As used herein, the term "colorant" means any substance that imparts color and/or other opacity and/or other visual effect to the composition. Example colorants include pigments, dyes and tints, such as those used in the paint industry and/or listed in the Dry Color Manufacturers Association (DCMA), as well as special effect compositions. In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" conversion composition and "an" oxidizing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed and/or unrecited elements, materials, ingredients and/or method steps. As used herein, "consisting of" is understood in the context of this application to exclude the presence of any unspecified element, ingredient and/or method step. As used herein, "consisting essentially of" is understood in the context of this application to include the specified elements, materials, ingredients and/or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, and/or provided on but not necessarily in contact with the surface. For example, a coating layer "formed over" a substrate does not preclude the presence of one or more other intervening coating layers of the same or different composition located between the formed coating layer and the substrate.

Unless otherwise disclosed herein, the term "substantially free," when used with respect to the absence of a particular material, means that such material, if present at all in a composition, a bath containing the composition, and/or layers formed from and comprising the composition, only is present in a trace amount of 5 ppm or less based on a total weight of the composition, bath and/or layer(s), as the case may be. Unless otherwise disclosed herein, the term "essentially free," when used with respect to the absence of a particular material, means that such material, if present at all in a composition, a bath containing the composition, and/or layers formed from and comprising the composition, only is present in a trace amount of 1 ppm or less based on a total weight of the composition, bath and/or layer(s), as the case may be. Unless otherwise disclosed herein, the term "completely free," when used with respect to the absence of a particular material, means that such material, if present at all in a composition, a bath containing the composition, and/or layers formed from and comprising the composition, is absent from the composition, the bath containing the composition, and/or layers formed from and comprising same (i.e., the composition, bath containing the composition, and/or layers formed from and comprising the composition contain 0 ppm of such material). When a composition, bath containing a composition, and/or a layer(s) formed from and comprising the same is substantially free, essentially free, or completely free of a particular material, this means that such material is excluded therefrom, except that the material may be present as a result of, for example, carry-over from prior treatment baths in the processing line, municipal water sources, substrate(s), and/or dissolution of equipment.

As used herein, a "salt" refers to an ionic compound made up of metal cations and non-metallic anions and having an overall electrical charge of zero. Salts may be hydrated or anhydrous.

As used herein, "aqueous composition" refers to a solution or dispersion in a medium that comprises predominantly water. For example, the aqueous medium may comprise water in an amount of more than 50 wt. %, or more than 70 wt. % or more than 80 wt. % or more than 90 wt. % or more than 95 wt. %, based on the total weight of the medium. The aqueous medium may for example consist substantially of water.

As used herein, "conversion composition" or "pretreatment composition" refers to a composition that is capable of reacting with and chemically altering the substrate surface and binding to it to form a film that affords corrosion protection.

As used herein, "conversion composition bath" or "pretreatment bath" refers to an aqueous bath containing the conversion composition and that may contain components that are byproducts of the process.

As used herein, the phrase "activating rinse" refers to a continuous aqueous medium having dispersed and/or suspended therein metal phosphate particles that is applied onto at least a portion of a substrate and/or into which at least a portion of a substrate is immersed to "activate" or "condition" the substrate in order to promote the formation of a metal phosphate coating on at least a portion of the substrate that was treated with the activating rinse. As used herein, to "activate" or "condition" the substrate surface means to create nucleation sites on the substrate surface. While not wishing to be bound by theory, it is believed that such nucleation sites promote the formation of metal phosphate crystals on the substrate surface when the substrate surface subsequently is treated with a metal phosphate pretreatment composition. For example, activation of the substrate surface is believed to create nucleation sites that promote the formation of zinc and zinc/iron phosphate crystals on the substrate surface when the substrate surface is pretreated with a zinc phosphate pretreatment composition.

As used herein, the term "dispersion" refers to a two-phase transparent, translucent or opaque system in which metal phosphate particles are in the dispersed phase and an aqueous medium, which includes water, is in the continuous phase.

As used herein, the term "Group IA metal" refers to an element that is in Group IA of the CAS version of the Periodic Table of the Elements as is shown, for example, in the Handbook of Chemistry and Physics, $63^{rd}$ edition (1983), corresponding to Group 1 in the actual IUPAC numbering.

As used herein, the term "Group IA metal compound" refers to compounds that include at least one element that is in Group IA of the CAS version of the Periodic Table of the Elements.

As used herein, the term "Group IIIB metal" refers to yttrium and scandium of the CAS version of the Periodic Table of the Elements as is shown, for example, in the Handbook of Chemistry and Physics, $63^{rd}$ edition (1983), corresponding to Group 3 in the actual IUPAC numbering. For clarity, "Group IIIB metal" expressly excludes lanthanide series elements.

As used herein, the term "Group IIIB metal compound" refers to compounds that include at least one element that is in group IIIB of the CAS version of the Periodic Table of the Elements as defined above.

As used herein, the term "Group IVB metal" refers to an element that is in group IVB of the CAS version of the Periodic Table of the Elements as is shown, for example, in the Handbook of Chemistry and Physics, $63^{rd}$ edition (1983), corresponding to Group 4 in the actual IUPAC numbering.

As used herein, the term "Group IVB metal compound" refers to compounds that include at least one element that is in Group IVB of the CAS version of the Periodic Table of the Elements.

As used herein, the term "Group VB metal" refers to an element that is in group VB of the CAS version of the Periodic Table of the Elements as is shown, for example, in the Handbook of Chemistry and Physics, $63^{rd}$ edition (1983), corresponding to Group 5 in the actual IUPAC numbering.

As used herein, the term "Group VB metal compound" refers to compounds that include at least one element that is in Group VB of the CAS version of the Periodic Table of the Elements.

As used herein, the term "Group VIB metal" refers to an element that is in group VIB of the CAS version of the Periodic Table of the Elements as is shown, for example, in the Handbook of Chemistry and Physics, $63^{rd}$ edition (1983), corresponding to Group 6 in the actual IUPAC numbering.

As used herein, the term "Group VIB metal compound" refers to compounds that include at least one element that is in Group VIB of the CAS version of the Periodic Table of the Elements.

As used herein, the term "lanthanide series elements" refers to elements 57-71 of the CAS version of the Periodic Table of the Elements and includes elemental versions of the lanthanide series elements. In embodiments, the lanthanide series elements may be those which have both common oxidation states of +3 and +4, referred to hereinafter as +3/+4 oxidation states.

As used herein, the term "lanthanide compound" refers to compounds that include at least one of elements 57-71 of the CAS version of the Periodic Table of the Elements.

As used herein, the term "halogen" refers to any of the elements fluorine, chlorine, bromine, iodine, and astatine of the CAS version of the Periodic Table of the Elements, corresponding to Group VIIA of the periodic table.

As used herein, the term "halide" refers to compounds that include at least one halogen.

As used herein, the term "oxidizing agent," when used with respect to a component of the conversion composition, refers to a chemical which is capable of oxidizing at least one of: a metal present in the substrate which is contacted by the conversion composition, a lanthanide series metal cation present in the conversion composition, and/or a metal-complexing agent present in the conversion composition. As used herein with respect to "oxidizing agent," the phrase "capable of oxidizing" means capable of removing electrons from an atom or a molecule present in the substrate or the conversion composition, as the case may be, thereby decreasing the number of electrons of such atom or molecule.

Unless otherwise disclosed herein, as used herein, the terms "total composition weight", "total weight of a composition" or similar terms refer to the total weight of all ingredients being present in the respective composition including any carriers and solvents.

In view of the foregoing description the present invention thus relates in particular, without being limited thereto, to the following Aspects 1-30:

Aspects

Aspect 1. A system for treating a surface of a multi-metal article comprising:
(a) a first conversion composition for contacting at least a portion of the surface, the first conversion composition comprising phosphate ions and zinc ions and being substantially free of fluoride; and
(b) a second conversion composition for treating at least a portion of the surface, the second conversion composition comprising a lanthanide series metal cation and an oxidizing agent; and/or
(c) a third conversion composition for treating at least a portion of the surface, the third conversion composition comprising an organophosphate compound, an organophosphonate compound, or combinations thereof.

Aspect 2. The system of Aspect 1, further comprising an activating rinse for contacting at least a portion of the surface prior to the contacting with the first conversion composition, the activating rinse comprising a dispersion of metal phosphate particles having a $D_{90}$ particle size of no greater than 10 μm, wherein the metal phosphate comprises divalent or trivalent metals or combinations thereof.

Aspect 3. The system of Aspect 2, wherein the metal phosphate particles have a $D_{90}$ particle size of no more than 1 μm.

Aspect 4. The system of Aspect 1, further comprising an activating rinse for contacting at least a portion of the surface prior to the contacting with the first conversion composition, the activating rinse comprising colloidal titanium-phosphate particles.

Aspect 5. The system of any of the preceding Aspects, wherein the lanthanide series metal cation comprises cerium, praseodymium, or combinations thereof.

Aspect 6. The system of any of the preceding Aspects, wherein the lanthanide series metal cation is present in the second conversion composition in an amount of 50 ppm to 500 ppm (calculated as metal cation) based on total weight of the second conversion composition.

Aspect 7. The system of any of the preceding Aspects, wherein the third conversion composition has a solids content of 0.5% to 15% based on total composition.

Aspect 8. The system of any of the preceding Aspects, wherein the third conversion composition has a pH of 3 to 7.

Aspect 9. The system of any of the preceding Aspects, wherein the third conversion composition is substantially free of transition metal.

Aspect 10. The system of any of the preceding Aspects, wherein the third conversion composition comprises a transition metal cation present in an amount of 50 ppm to 500 ppm based on total weight of the third conversion composition.

Aspect 11. The system of any of the preceding Aspects, wherein the organophosphate compound comprises a phosphatized epoxy.

Aspect 12. The system of any of the preceding Aspects, wherein the system is substantially free of fluoride.

Aspect 13. The system of any of the preceding Aspects, wherein the second conversion composition and/or the third conversion composition is substantially free of copper.

Aspect 14. A substrate treated with the system of any of the preceding Aspects.

Aspect 15. The substrate of Aspect 14, wherein the substrate has a b* value of less than 3.09 (spectral component excluded, 25 mm aperture).

Aspect 16. A method for treating a multi-metal article comprising:
(a) contacting at least a portion of a surface of the article with a first conversion composition comprising phosphate ions and zinc ions and being substantially free of fluoride; and
(b) contacting at least a portion of the surface with a second conversion composition comprising a lanthanide series metal cation and an oxidizing agent; and/or
(c) contacting at least a portion of the surface with a third conversion composition comprising an organophosphonate compound, an organophosphate compound, or combinations thereof.

Aspect 17. The method of Aspect 16, wherein the contacting with the second conversion composition occurs after the contacting with the first conversion composition.

Aspect 18. The method of Aspect 16 or Aspect 17, wherein the contacting with the third conversion composition occurs after the contacting with the first conversion composition.

Aspect 19. The method of any of Aspects 16 to 18, further comprising contacting at least a portion of the surface with an activating rinse comprising phosphate particles prior to contacting the surface with the first conversion composition.

Aspect 20. The method of Aspect 19, wherein the activating rinse comprises a dispersion of metal phosphate particles having a $D_{90}$ particle size of no greater than 10 μm, wherein the metal phosphate comprises divalent or trivalent metals or combinations thereof.

Aspect 21. The method of any of Aspects 16 to 20, wherein the substrate is contacted with the second conversion composition for 15 seconds to 5 minutes and/or the substrate is heated for 10 minutes to 30 minutes at a temperature of 130° C. to 220° C.

Aspect 22. The method of any of Aspects 16 to 21, wherein the contacting with the second conversion composition results in a level of the lanthanide series metal cation on the treated substrate surface of at least 100 counts greater than on a surface of a substrate that is not contacted with the first and second conversion compositions as measured by X-ray fluorescence (as measured using X-Met 7500, Oxford Instruments; operating parameters 60 second timed assay, 15 Kv, 45 μA, filter 3, T(p)=1.5 μs for lanthanide).

Aspect 23. A multi-metal substrate treated with the method of any of Aspects 16 to 22.

Aspect 24. The substrate of any of Aspects 14, 15, or 23, wherein the substrate treated with the first and the second conversion composition has a scribe creep on the substrate surface that is maintained compared to a substrate that is contacted with a composition comprising zinc phosphate and free fluoride ((ASTM-B 368-09 Copper Acetic Acid Salt Spray, 240 hours).

Aspect 25. The substrate of any of Aspects 14, 15, 23, or 24, wherein the substrate treated with the first and the second conversion compositions has a scribe creep on the substrate surface that is maintained compared to a substrate that is contacted with a composition comprising zinc phosphate and free fluoride (GMW 14782, 30-day cycle).

Aspect 26. The substrate of any of Aspects 14, 15, or 23 to 25, wherein the substrate treated with the first and the second conversion compositions has at least a 2% decrease in scribe creep on the substrate surface compared to a substrate that is contacted with a composition comprising zinc phosphate and free fluoride (ASTM-B 368-09 Copper Acetic Acid Salt Spray, 240 hours).

Aspect 27. The substrate of any of Aspects 14, 15, or 23 to 26, wherein the substrate treated with the first and the second conversion compositions has at least a 2% decrease in scribe creep on the substrate surface compared to a substrate that is contacted with a composition comprising zinc phosphate and free fluoride (GMW 14782, 30-day cycle).

Aspect 28. The substrate of any of Aspects 14, 15, or 23 to 27, wherein the substrate treated with the first and the second conversion compositions has at least a 16% decrease in scribe creep on the substrate surface compared to a substrate that is contacted with a composition comprising zinc phosphate and free fluoride (GMW 14782, 30-day cycle).

Aspect 29. The substrate of any of Aspects 14, 15, or 23 to 28, wherein the substrate treated with the first and the third conversion compositions has a scribe creep on the substrate surface that is at least maintained compared to a substrate that is contacted with a composition comprising zinc phosphate and free fluoride ((ASTM-B 368-09 Copper Acetic Acid Salt Spray, 240 hours).

Aspect 30. The substrate of any of Aspects 14, 15, or 23 to 29, wherein the substrate treated with the first and the third conversion compositions has a scribe creep on the substrate surface that is at least maintained compared to a substrate that is contacted with a composition comprising zinc phosphate and free fluoride (GMW 14782, 30-day cycle).

Illustrating the invention are the following examples that are not to be considered as limiting the invention to their details. All parts and percentages in the examples, as well as throughout the specification, are by weight unless otherwise indicated.

EXAMPLES

Cleaner Composition 1

A 10-gallon cleaner composition bath was prepared in deionized water at 1.25% v/v concentration of Chemkleen 2010LP (a phosphate-free alkaline cleaner available from PPG Industries, Inc.) and 0.125% of Chemkleen 181 ALP (a phosphate-free blended surfactant additive, available from PPG). In use, the temperature of the bath was 120° F.

Cleaner Composition 2

A 10-gallon cleaner composition bath was prepared in deionized water at 1.25% v/v concentration of Chemkleen SP1 (a phosphate-containing cleaner package available from PPG Industries, Inc.) and 0.125% of Chemkleen 185 A (a blended surfactant additive, available from PPG Industries, Inc.). In use, the temperature of the bath was 120° F.

Activating Rinse/Rinse Conditioner Composition 1

1.1 g/L of Versabond RC (also known as RC30, commercially available from PPG Industries, Inc.) was added to a filled 5-gallon (18.79 liters) vessel of deionized water to be utilized immediately prior to the use of the zinc phosphate bath described above. The temperature of the bath was 80° F.

Activating Rinse/Rinse Conditioner Composition 2

1.36 g/L of the below zinc phosphate-based activating rinse was added to a filled 5-gallon (18.79 liters) vessel of deionized water to be utilized immediately prior to the use of the zinc phosphate bath described below. The temperature of the bath was 80° F.

A zinc phosphate-based activating rinse was prepared as follows: 4717.6 grams of zinc phosphate pigment was sifted into a pre-blended mixture of 1700.18 grams deionized water, 1735.92 grams of dispersant (Disperbyk-190, commercially available from BYK-Chemie GmbH), and 56.36 grams of defoamer (BYK-011, commercially available from BYK-Chemie GmbH) and mixed for 30 minutes using a Fawcett Air Mixer, model LS-103A with a type 1 angled tooth/Cowles style blade. An additional 680.47 grams of deionized water, as well as 2590.25 grams Disperbyk-190 and 55.5 grams of BYK-011, were added and mixed for an additional 20 minutes. This mixture was then milled in recirculation mode through an HM 1.5 L horizontal mill (manufactured by Premier Mill Corp.) containing 0.5 mm zirconium oxide media for 60 minutes of residence time. An additional 1180 grams of deionized water were added throughout the milling process. Several interim process samples were taken throughout the milling, such that a final yield of 10,455.62 grams was obtained. This material had a concentration of 36.78% by weight of zinc phosphate. The final product had a volume-weighted $D_{90}$ particle size of 0.26 μm (sonicated). As used herein, the term "$D_{90}$" particle size refers to a volume-weighted particle distribution in which 90% of the particles in the particle distribution have a diameter smaller than the "$D_{90}$" value. According to the present invention, particle size was measured using a Mastersizer 2000, available from Malvern Instruments, Ltd., of Malvern, Worcestershire, UK. The Mastersizer 2000 directs a laser beam (0.633 mm diameter, 633 nm wavelength) through a dispersion of particles (in distilled, deionized or filtered water to 2-3% obscuration), and measures the light scattering of the dispersion (measurement parameters 25° C., 2200 RPM, 30 sec premeasurement delay, 10 sec background measurement, 10 sec sample measurement). The amount of light scattered by the dispersion is inversely proportional to the particle size. A series of detectors measure the scattered light and the data are then analyzed by computer software (Malvern Mastersizer 2000 software, version 5.60) to generate a particle size distribution, from which particle size can be routinely determined.

Conversion Composition 1 (Zinc Phosphate- and Fluoride-Containing, Comparative)

A 5-gallon vessel was filled approximately three-fourths full with deionized water. To this was added 700 ml of Chemfos 700A, 1.5 ml Chemfos FE, 51 ml Chemfos AFL, and 375 ml of Chemfos 700B (all available from PPG). To this was added 28.6 g zinc nitrate hexahydrate and 2.5 grams of Sodium Nitrite (both available from Fischer Scientific). The bath had 226 ppm free fluoride as measured by an Orion Dual Star Dual Channel Benchtop Meter equipped with a fluoride ion selective electrode ("ISE") available from Thermoscientific, the Symphony® Fluoride Ion Selective Combination Electrode supplied by VWR International. The free acid of the bath was operated at 0.7-0.8 points of free acid, 15-19 points of total acid, and 2.2-2.7 gas points of nitrite.

The amount of free acid was measured by filtering a sample of the zinc phosphate conversion composition bath using Reeve Angel 802 filter paper. Ten ml of the filtered sample were pipetted into a clean, dry 150 ml beaker, 3-5 drops of Bromphenol Blue Indicator were added to the beaker containing the filtered sample, and then the sample was titrated with 0.1 N sodium hydroxide from yellow-green to a clear, light blue, absence of green but before blue-violet, end point. The number of ml of 0.1 N sodium hydroxide used was recorded as the free acid points.

The amount of total acid was measured by filtering a sample of the zinc phosphate conversion composition bath using Reeve Angel 802 filter paper. Ten ml of the filtered sample were pipetted into a clean, dry 150 ml beaker, 3-5 drops of Phenolphthalein indicator were added to the beaker containing the filtered sample, and then the sample was titrated with 0.1 N sodium hydroxide until a permanent pink color appeared. The number of ml of 0.1 N sodium hydroxide used was recorded as the total acid.

The amount of nitrite in solution was measured using a fermentation tube using the protocol described in the technical data sheet for Chemfos Liquid Additive (PPG Industries, Inc., Cleveland, Ohio). A fermentation tube was filled with a 70 mL sample of the conversion composition bath to just below the mouth of the tube. Approximately 2.0 g of sulfamic acid was added to the tube, and the tube was inverted to mix the sulfamic acid and conversion composition solution. Gas evolution occurred, which displaced the liquid in the top of the fermentation tube, and the level was read and recorded. The level corresponded to the gas points measured in the solution in milliliters.

To adjust to obtain the correct amounts of free and total acid, CF700 B was utilized to adjust according to product data sheet. The temperature of the bath was 125° F. and when panels were run through the bath it was utilized for 2 minutes.

Conversion Composition 2 (Zirconium-Containing, Comparative)

Zircobond 1.5 (a zirconium-containing conversion composition commercially available from PPG Industries, Inc.) was added to 5 gallons of deionized water according to manufacturer's instructions to yield a composition containing 175 ppm zirconium, 35 ppm copper, and 100 ppm free fluoride.

The resultant solution had a pH of 4.72, measured using a Thermo Scientific Orion Dual Star pH/ISE Bench Top Reader attached to an Accumet Cat #13-620-221 pH probe. The temperature of the bath was 80° F.

Conversion Composition 3 (Zirconium-Containing, Comparative)

Zircobond 2.0 (a zirconium-containing conversion composition commercially available from PPG Industries, Inc.) was added to 5 gallons of deionized water according to manufacturer's instructions to yield a composition containing 175 ppm of zirconium, 5 ppm lithium, 40 ppm molybdenum, 30 ppm copper, and 100 ppm free fluoride.

The resultant solution had a pH of 4.72. The temperature of the bath was 80° F.

Conversion Composition 4 (Cerium-Containing, Experimental)

To a 2-liter vessel of deionized water was added 3 Grams Cerium (III) Chloride Heptahydrate (Available from Acros Organics) and 5 Grams 29-32% Hydrogen Peroxide (Available from Alfa Aesar). The temperature of the bath was ambient, and the bath was still when the panel was immersed (i.e., not stirred or agitated).

Conversion Composition 5 (Fluoride-Free Zinc Phosphate, Experimental)

A fluoride-free zinc phosphate conversion composition was prepared as follows:

Chemfos 700A (Fluoride Free) 2200 Gram Solution of Concentrate

| Chemical | Quantity |
| --- | --- |
| Deionized Water | 1477.1 g |
| Phosphoric Acid (85% Fisher Scientific) | 436.9 g |
| Nitric Acid (Reagent Fisher Scientific) | 39.6 g |
| Nickel Nitrate Solution (CF-N) (PPG Product) | 130.4 g |
| Acetaldehyde Oxime 50% in Water (Sigma-Aldrich) | 4.4 g |
| Zinc Oxide (Umicore Zinc Chemicals) | 53 g |
| Manganese (II) Oxide 76-78% (Alfa Aesar) | 57.4 g |
| Dowfax 2A1 Surfactant (Dow Chemical) | 1.2 g |

A 5-gallon vessel was filled approximately three-fourths full with deionized water. To this was added 700 ml of Chemfos 700A (Fluoride Free) concentrate as above, 1.5 ml Chemfos FE (available from PPG), and 375 mls of Chemfos 700B (available from PPG). To this was added 28.6 g zinc nitrate hexahydrate and 2.5 grams of Sodium Nitrite (both available from Fischer Scientific). The bath had 0.014 ppm of free fluoride, measured as described above. The free acid of the bath was operated at 0.7-0.8 points of free acid, 15-19 points of total acid, and 2.2-2.7 gas points of nitrite (measured as described above), and were adjusted as needed using CF700 B (according to product data sheet).

Conversion Composition 6 (Zirconium-Containing Comparative)

Zircobond 2.0 (a zirconium-containing conversion composition commercially available from PPG Industries, Inc.) was added to 5 gallons of deionized water according to manufacturer's instructions to yield a composition containing 175 ppm of zirconium, 5 ppm lithium, 80 ppm molybdenum, 30 ppm copper, and 85 ppm free fluoride.

The resultant solution had a pH of 4.67. The temperature of the bath was 80° F.

Conversion Composition 7 (Phosphatized Epoxy Resin Pretreatment, Experimental)

NUPAL 435 (a phosphatized epoxy resin-based conversion composition commercially available from PPG Industries, Inc.) was added to 5 gallons of deionized water according to the manufacturer's instructions to yield a composition that contained 10% by weight or 5% resin solids at a native pH of 5.06. The temperature of the bath was 80° F.

Example 1

Test Panel Preparation

Aluminum Panel Preparation: X610 (Product Code 54074, ACT Test Panels LLC, Hillsdale, Mich.) were cut in half to make panel size 4"×6". The bottom 3 inches of each panel was sanded with P320 grit paper available from 3M which was utilized on a 6" random orbital palm sander available from ATD (Advanced Tool Design Model-ATD-2088). The sanding was utilized to help determine any corrosion performance that may have been on sanded and unsanded parts of the metal. Sanding is used in the field as a means to increase the adhesion of subsequent paint surfaces.

For each run, two of the half-sanded X610 Aluminum panels were first cleaned as follows: All testing panels were spray cleaned in a stainless-steel spray cabinet using Vee-jet nozzles at 10 to 15 psi, using a bath containing Cleaner Composition 1 for two minutes at 49° C., followed by immersion rinse in deionized water for 15 seconds and spray rinse with deionized water for 15 seconds using a Melnor Rear-Trigger 7-Pattern nozzle set to shower mode (available from Home Depot).

Panels were then introduced into one of the conversion composition baths described above as follows:

Set 1—Panels were immersed in the bath containing the Rinse Conditioner Composition 1 for 1 minute and then immediately were immersed in the bath containing Conversion Composition 1 for 2 minutes.

Set 2—Panels were immersed in the bath containing Conversion Composition 2 for 2 minutes.

Set 3—Panels were immersed in the bath containing Conversion Composition 3 for 2 minutes.

Set 4—Panels were immersed in the bath containing Conversion Composition 4 for 2 minutes.

Following immersion in one of the baths described above, all panels then were spray rinsed with DI water for 20-30 seconds using the Melnor Rear-Trigger 7-Pattern nozzle set to shower mode described above. Panels were warm air dried using a Hi-Velocity handheld blow-dryer made by Oster® (model number 078302-300-000) on high-setting at a temperature of 50-55° C. until the panel was dry (1-5 minutes).

After drying, the panels were electrocoated with ED7000Z electrocoat, available from PPG. The electrocoat was applied to target a 0.60 mil thickness. The rectifier (Xantrex Model XFR600-2) was set to the "Coulomb Controlled" setting. The conditions were set with 23 coulombs for Zinc Phosphate pretreated panels and 24 Coulombs for Zirconium pretreated panels and the experimental Cerium Chloride pretreated panels, 0.5 amp limit, voltage set point of 220 V for Zinc Phosphate pretreated panels and 180V for Zirconium pretreated panels and the experimental Cerium Chloride pretreated panels, and a ramp time of 30 s. The electrocoat was maintained at 90° F., with a stir speed of 340 rpms. After the electrocoat was applied, the panels were baked in an oven (Despatch Model LFD-1-42) at 177° C. for 25 minutes. The coating thickness was measured using a film thickness gauge (Fischer Technology Inc. Model FMP40C).

Panels were evaluated for a yellowing of the electrocoat layer by visual inspection by the naked eye. Data are reported in Table 1.

Panels also were tested for scribe creep blistering using the ASTM-B 368-09 Copper Acetic Acid Salt Spray, to measure scribe creep. Scribe creep was measured from affected paint to affected paint to the left and right of the scribe. The scribe was placed into the panel prior to being placed into the cabinet for a length of 480 hours. The scribe was measured according to the following protocol: the scribe length was 4 inches/10.16 cm. A reading of affected paint to affected paint was measured at each cm along the scribe creating a total of 10 points of measurement. From this the average of the two panels was used to calculate the average scribe creep reported in Table 1 below. The measurements were made by the use of a Fowler Sylvac digital caliper Model S 235.

TABLE 1

Average Scribe Creep (mm) and Color of Electrocoat (Example 1)

| Set | Conversion composition | Average Scribe Creep (% reduction of experimental relative to comparative) | Yellowing after Electrocoat |
|---|---|---|---|
| 1 | Composition 1 (Comparative) | 3.52 mm (65% reduction) | No |
| 2 | Composition 2 (Comparative) | 1.70 mm (27% reduction) | Yes |
| 3 | Composition 3 (Comparative) | 1.31 mm (5% reduction) | Yes |
| 4 | Composition 4 (Experimental) | 1.24 mm | No |

The data in Table 1 demonstrate that an electrocoated panel pretreated with a conversion composition comprising cerium results in a 5% reduction in the scribe creep following 480 hours exposure to copper acetic salt spray (ASTM-B 368-09) compared to an electrocoated panel pretreated with Conversion Composition 3 (i.e., a zirconium pretreatment also containing molybdenum and lithium). Notably, an electrocoated panel treated with the zirconium-containing conversion composition was visibly yellow to the naked eye, while an electrocoated panel treated with a lanthanide series metal cation-containing conversion composition was not visibly yellow to the naked eye.

The data in Table 1 also demonstrate that an electrocoated panel pretreated with a conversion composition comprising cerium results in a 27% reduction in the scribe creep following 480 hours exposure to copper acetic salt spray (ASTM-B 368-09) compared to an electrocoated panel pretreated with Conversion Composition 2 (i.e., a zirconium-containing conversion composition). Notably, an electrocoated panel treated with the zirconium-containing conversion composition was visibly yellow to the naked eye, while an electrocoated panel treated with a lanthanide series metal cation-containing conversion composition was not visibly yellow to the naked eye.

The data shown in Table 1 also demonstrate that an electrocoated panel pretreated with a conversion composition comprising cerium results in a 65% reduction in the scribe creep following 480 hours exposure to copper acetic salt spray (ASTM-B 368-09) compared to an electrocoated panel pretreated with Conversion Composition 1 (i.e., a zinc phosphate-containing conversion composition).

Example 2

Test Panel Preparation

4"×12" panels of 6111 Aluminum (available from ACT Test Panels, LLC, product no. 39279) were cut in half to make panels of 4"×6". The bottom 3 inches of each aluminum panel was sanded with P320 grit paper available from 3M which was utilized on a 6" random orbital palm sander available from ATD (Advanced Tool Design Model-ATD-2088). Electrogalvanized steel panels (product no. 28112) and cold rolled steel panels (product no. 28110) (both available from ACT Test Panels, LLC) also were cut from 4"×12" to 4"×6".

For each set, three half-sanded 6111 Aluminum panels, three panels of electrogalvanized steel, and three panels of cold rolled steel were cleaned by spray cleaning in a stainless-steel spray cabinet using Vee-jet nozzles at 10 to 15 psi, using Cleaner Composition 2 for two minutes at 120° F., followed by an immersion rinse in deionized water for 15 seconds and then a spray rinse with deionized water for 15 seconds using the Melnor Rear-Trigger 7-Pattern nozzle set to shower mode described above.

Panels were then introduced into one of the conversion composition baths described above as follows:

Set 5—Panels were immersed in the bath containing the Rinse Conditioner Composition 1 (bath temperature ambient) for 1 minute and then immediately were immersed in a bath containing Conversion Composition 1 (bath temperature 125° F.) for 2 minutes.

Set 6—Panels were immersed in a bath containing Conversion Composition 3 (bath temperature 80° F.) for 2 minutes.

Set 7—Panels were immersed in a bath containing the Rinse Conditioner Composition 1 (bath temperature ambient) for 1 minute and then were immediately immersed in the bath containing Conversion Composition 5 (bath temperature 125° F.) for 2 minutes. Panels were spray rinsed for 15 seconds with deionized water using the Melnor Rear-Trigger 7-Pattern nozzle set to shower mode described above, and then were immersed in a bath containing Conversion Composition 4 (ambient, no bath agitation) for 2 minutes.

Following immersion in one of the conversion composition baths described above, all panels then were spray rinsed with deionized water for 20-30 seconds using the Melnor Rear-Trigger 7-Pattern nozzle set to shower mode described above. Panels were warm air dried using the Hi-Velocity handheld blow-dryer made by Oster® described above on high-setting at a temperature of 50 C-55 C until the panel was dry (1 minute to 5 minutes).

After drying, all panels were electrocoated with ED6280Z electrocoat, available from PPG. The electrocoat was applied to target a 0.80 mil thickness. The rectifier (Xantrex Model XFR600-2) was set to the "Coulomb Controlled" setting at range of 26-32 coulombs. The conditions were set with 0.5 amp limit, voltage set point of 220 V for zinc phosphate-containing conversion compositions (Sets 5 and 7) and 180V for zirconium-containing conversion compositions (Set 6) with a ramp time of 30 s. The electrocoat was maintained at 90° F., with a stir speed of 340 rpms. After the electrocoat was applied, the panels were baked in an oven (Despatch Model LFD-1-42) at 177° C. for 25 minutes. The coating thickness was measured using a film thickness gauge (Fischer Technology Inc. Model FMP40C).

Aluminum 6111 panels were tested for scribe creep blistering as described in Example 1, except that panels were placed into the cabinet for 240 hours. Data are reported in Table 2 below.

TABLE 2

Average Scribe Creep and Film Builds on Aluminum Substrate (Example 2)

| Set | Conversion composition | Average Scribe Creep (% reduction of experimental relative to comparative) |
| --- | --- | --- |
| 5 | Composition 1 (Comparative) | 3.29 (2%) |
| 6 | Composition 3 (Comparative) | 2.68 (−20%) |
| 7 | Compositions 5 + 4 (Experimental) | 3.22 |

The data in Table 2 demonstrate that electrocoated aluminum 6111 panels immersed in a fluoride-free zinc phosphate conversion composition followed by a cerium-containing conversion composition results in a 2% reduction in the scribe creep following 240 hours exposure to copper acetic salt spray (ASTM-B 368-09) compared to an electrocoated panel pretreated with Conversion Composition 1 (i.e., a fluoride-containing zinc phosphate conversion composition). It is known in the art that zirconium deposits better onto aluminum substrate than does phosphate, and therefore the decreased reduction of scribe creep on aluminum panels pretreated with the fluoride-free zinc phosphate conversion composition followed by the cerium-containing conversion composition was not surprising. The important finding in this example is that reduction in scribe creep was at least maintained, if not slightly improved, relative to fluoride-containing zinc phosphate conversion composition alone on aluminum substrate.

Electrogalvanized panels and cold rolled steel panels were tested for scribe creep blistering according to GMW 14872. Scribes were made on the panels as described in Example 1 and were made prior to placing the panels into the cabinet for 30 cycles/days. Scribes were measured as described in Example 1. Data are reported in Tables 3 (electrogalvanized) and 4 (cold rolled steel) below.

TABLE 3

Average Scribe Creep and Film Builds on Electrogalvanized Substrate (Example 2)

| Set | Conversion composition | Average Scribe Creep (% reduction of experimental relative to comparative) |
| --- | --- | --- |
| 5 | Composition 1 (Comparative) | 2.42 (16%) |
| 6 | Composition 3 (Comparative) | 3.17(36%) |
| 7 | Compositions 5 + 4 (Experimental) | 2.04 |

The data in Table 3 demonstrate that electrocoated electrogalvanized panels pretreated with a fluoride-free zinc phosphate conversion composition followed by a cerium-containing conversion composition results in a 16% reduction in the scribe creep following 30 days exposure to GMW 14872 testing compared to an electrocoated panel pretreated with Conversion Composition 1 (i.e., a fluoride-containing zinc phosphate conversion composition) and a 36% reduction in the scribe creep following 30 days exposure to GMW 14872 testing compared to an electrocoated panel pretreated with Conversion Composition 3 (i.e., a zirconium-containing conversion composition).

TABLE 4

Average Scribe Creep and Film Builds on Cold Rolled Steel Substrate (Example 2)

| Set | Conversion composition | Average Scribe Creep (% reduction of experimental relative to comparative) |
| --- | --- | --- |
| 5 | Composition 1 (Comparative) | 3.58 (37%) |
| 6 | Composition 3 (Comparative) | 2.58 (12%) |
| 7 | Compositions 5 + 4 (Experimental) | 2.27 |

The data in Table 4 demonstrate that electrocoated cold rolled steel panels pretreated with a fluoride-free zinc phosphate conversion composition followed by a cerium-containing conversion composition results in a 37% reduction in the scribe creep following 30 days exposure to GMW 14872 testing compared to an electrocoated panel pretreated with Conversion Composition 1 (i.e., a fluoride-containing zinc phosphate conversion) and a 12% reduction in the scribe creep following 30 days exposure to GMW 14872 testing compared to an electrocoated panel pretreated with Conversion Composition 3 (i.e., a zirconium-containing conversion composition).

Together, the data in Tables 3 and 4 demonstrate that scribe creep on two types of steel panels treated with the fluoride-free zinc phosphate composition followed by the cerium chloride composition was as good as panels treated with the fluoride-containing zinc phosphate composition. Additionally, scribe creep on electrogalvanized panels was better on panels treated with the fluoride-free zinc phosphate composition followed by the cerium chloride composition than on panels treated with the fluoride-containing zinc phosphate composition or the zirconium-containing composition. Finally, scribe creep on cold rolled steel panels was better on panels treated with the fluoride-free zinc phosphate composition followed by the cerium chloride composition than on panels treated with the fluoride-containing zinc phosphate composition or the zirconium-containing composition. The inventive system (fluoride-free zinc phosphate conversion composition followed by cerium conversion composition) provides a method of treating multi-metal substrates to provide improved performance of subsequent organic and inorganic coatings.

Example 3

In this example, 6111 aluminum panels (ACT) were evaluated for deposition of cerium or zinc phosphate and for coloration of the pretreated panels.

4"×12" panels of 6111 Aluminum (available from ACT Test Panels, LLC, product no. 39279) were cut in half to make panels of 4"×6".

For each set, one 111 Aluminum panel was cleaned by spray cleaning in a stainless-steel spray cabinet using Vee-jet nozzles at 10 to 15 psi, using Cleaner Composition 2 for two minutes at 120° F., followed by an immersion rinse in deionized water for 15 seconds and then a spray rinse with deionized water for 15 seconds using the Melnor Rear-Trigger 7-Pattern nozzle set to shower mode described above. The panel in Set 8 was immediately warm air dried using the Hi-Velocity handheld blow-dryer made by Oster® described above on high-setting at a temperature of 50 C-55 C until the panel was dry (1 minute to 5 minutes) (i.e., the panel in Set 8 was clean only, no conversion composition).

Panels in Sets 9-12 were then introduced into one of the conversion composition baths described above as follows:

Set 9—Panels were immersed in a bath containing the Rinse Conditioner Composition 1 (bath temperature ambient) for 1 minute and then were immediately immersed in the bath containing Conversion Composition 5 (bath temperature 125° F.) for 2 minutes.

Set 10—Panels were immersed in a bath containing Conversion Composition 4 (bath ambient) for 2 minutes.

Set 11—Panels were immersed in a bath containing the Rinse Conditioner Composition 1 (bath temperature ambient) for 1 minute and then were immediately immersed in the bath containing Conversion Composition 5 (bath temperature 125° F.) for 2 minutes. Panels were spray rinsed for 15 seconds with deionized water using the Melnor Rear-Trigger 7-Pattern nozzle set to shower mode described above, and then were immersed in a bath containing Conversion Composition 4 (ambient, no bath agitation) for 2 minutes.

Following immersion in one of the conversion composition baths described above, all panels then were spray rinsed with deionized water for 20-30 seconds using the Melnor Rear-Trigger 7-Pattern nozzle set to shower mode described above. Panels were warm air dried using the Hi-Velocity handheld blow-dryer made by Oster® described above on high-setting at a temperature of 50 C-55 C until the panel was dry (1 minute to 5 minutes).

Panel Set 12 was a comparative panel aluminum 6111 zinc phosphate treated panel purchased from ACT Test Panels (Product No. 42606, ACT Zinc Phosphate 6111AA panel) and was heated as described above.

Panels were analyzed for deposition of cerium, phosphorous, and zinc using X-ray fluorescence (measured using X-Met 7500, Oxford Instruments; operating parameters for cerium 60 second timed assay, 15 Kv, 45 µA, filter 3, T(p)=1.1 µs; operating parameters for phosphorus 60 second timed assay, 25 Kv, 20 µA, filter 1, T(p)=1.1 µs; operating parameters for zinc 60 second timed assay, 15 Kv, 45 µA, filter 3, T(p)=1.1 µs). Data are reported in Table 5, with each reported value being the average of two measurements taken at different positions on each panel.

TABLE 5

XRF measurements (Example 3)

| Element | Set 8 | Set 9 | Set 10 | Set 11 | Set 12 |
|---|---|---|---|---|---|
| Cerium (La) | 206 | 204 | 2197 | 761 | 297 |
| Phosphorus (Ka) | 14 | 14 | 12 | 15 | 653 |
| Zinc (Ka) | 1758 | 1757 | 1750 | 1805 | 36895 |

Panels also were measured for yellowness of the panels following conversion composition (measured using an X-rite Ci7800 Colorimeter, 25 mm aperture). Data are reported in Table 6, with each reported value being the average of two measurements taken at the same position on the panel. Data reported are Spectral Component Excluded.

TABLE 6

Spectral Analysis Prior to Heating Panels (Example 3)

| Set | L* | a* | b* | C* | h° | YI-E313[1] |
|---|---|---|---|---|---|---|
| 8 | 76.50 | −0.97 | 0.26 | 1.01 | 164.81 | −0.29 |
| 12 | 74.41 | 0.25 | 2.69 | 2.70 | 84.64 | 6.51 |
| 10 | 75.23 | −3.72 | 11.42 | 12.01 | 108.02 | 21.50 |
| 11 | 78.00 | −1.11 | 1.56 | 1.92 | 125.41 | 2.52 |

Next, panels analyzed in Sets 8, 10, and 12 were then baked in an oven (Despatch Model LFD-1-42) at 177° C. for 25 minutes (panels were not electrocoated). The panels were measured for yellowness of the panels heating of the pretreated panels (measured using an Xrite Ci7800 Colorimeter, 25 mm aperture). Data are reported in Table 7, with each reported value being the average of two measurements taken at the same position on the panel. Data reported are Spectral Component Excluded.

[1] Yellowness index measurement according to ASTM E313-00

TABLE 7

Spectral Analysis After Heating Panels (Example 3)

| Set | L* | a* | b* | C* | h° | YI-E313[2] |
|---|---|---|---|---|---|---|
| 8 | 75.68 | −0.60 | 0.99 | 1.16 | 121.21 | 1.75 |
| 12 | 74.49 | 0.65 | 3.09 | 3.16 | 78.07 | 7.81 |
| 10 | 74.46 | −0.86 | 2.08 | 2.25 | 112.38 | 4.06 |
| 11 | 77.43 | −0.03 | −0.03 | 0.04 | 218.61 | −0.09 |

The b* value and YI-E313 value of panels pretreated only with the cerium-containing composition (i.e., the panels were not pretreated with zinc phosphate first) had increased b* value compared to clean-only and zinc phosphate-only treated panels, indicating that the cerium-treated panel had a more yellow coloration. In contrast, the b* value and YI-E313 value of panels pretreated with fluoride-free zinc phosphate followed by cerium were significantly lower than the cerium-only treated panels and zinc phosphate-only treated panels, indicating that the zinc phosphate+cerium conversion compositions resulted in less yellow coloration of panels. Notably, the b* value and YI-E313 value were significantly lower in heated panels pretreated with cerium only or with zinc phosphate+cerium conversion compositions compared to unheated panels pretreated in the same way, indicating that heating of the panels further reduces the yellow coloration of the panels.

Example 4

Test Panel Preparation

4"×12" panels of 6111 Aluminum, 6022 Aluminum, Cold Rolled Steel, Electrogalvanized Steel, and Exposed Grade Hot Dipped Galvanized Steel (available from ACT Test Panels, LLC) were cut in half to make panels of 4"×6".

For each set, four panels of the Aluminum 6111 and 6022 Aluminum substrates and two panels of the ferrous substrates listed above were cleaned by spray cleaning in a stainless steel spray cabinet using Vee-jet nozzles at 10 to 15 psi, using the Cleaner Composition 2 for two minutes at 120° F., followed by an immersion rinse in deionized water for 15 seconds and then a spray rinse with deionized water for 15 seconds using the Melnor Rear-Trigger 7-Pattern nozzle set to shower mode (available from Home Depot).

Panels were then introduced into one of the conversion composition baths described above as follows:

Set 12—Panels were immersed in the bath containing the Rinse Conditioner Composition 1 (bath temperature ambient) for 1 minute and then immediately were immersed in a bath containing Conversion Composition 1 (bath temperature 125° F.) for 2 minutes.

Set 13—Panels were immersed in a bath containing Conversion Composition 6 (bath temperature 80° F.) for 2 minutes.

Set 14—Panels were immersed in a bath containing the Rinse Conditioner Composition 1 (bath temperature ambient) for 1 minute and then were immediately immersed in the bath containing Conversion Composition 5 (bath temperature 125° F.) for 2 minutes. Panels were spray rinsed for 15 seconds with deionized water using the Melnor Rear-Trigger 7-Pattern nozzle set to shower mode described above, and then were immersed in a bath containing Conversion Composition 7 (bath temperature 80° F.) for 2 minutes.

Set 15—Panels were immersed in a bath containing the Rinse Conditioner Composition 2 (bath temperature ambient) for 1 minute and then were immediately immersed in the bath containing Conversion Composition 5 (bath temperature 125° F.) for 2 minutes. Panels were spray rinsed for 15 seconds with deionized water using the Melnor Rear-Trigger 7-Pattern nozzle set to shower mode described above, and then were immersed in a bath containing Conversion Composition 7 (bath temperature 80° F.) for 2 minutes.

Following immersion in one of the conversion composition baths described above, all panels then were spray rinsed with deionized water for 20-30 seconds using the Melnor Rear-Trigger 7-Pattern nozzle set to shower mode described above. Panels were warm air dried using the Hi-Velocity handheld blow-dryer made by Oster® described above on high-setting at a temperature of 50° C.-55° C. until the panel was dry (1 minute to 5 minutes).

After drying, all panels were electrocoated with ED6280Z electrocoat, available from PPG. The electrocoat was applied to target a 0.80 mil thickness. The rectifier (Xantrex Model XFR600-2) was set to the "Coulomb Controlled" setting at range of 25-30 coulombs. The conditions were set with 0.5 amp limit, voltage set point of 220 V for zinc phosphate-containing conversion compositions (Sets 1, 3 and 4) and 180V for zirconium-containing conversion compositions (Set 2) with a ramp time of 30 s. The electrocoat was maintained at 90° F., with a stir speed of 340 rpms. After the electrocoat was applied, the panels were baked in an oven (Despatch Model LFD-1-42) at 177° C. for 25 minutes. The coating thickness was measured using a film thickness gauge (Fischer Technology Inc. Model FMP40C).

Two aluminum 6111 and two aluminum 6022 panels were tested for scribe creep blistering as described as ASTM-B 368-09 Copper Acetic Acid Salt Spray (CASS), to measure scribe creep. Scribe creep was measured from affected paint to affected paint to the left and right of the scribe. The scribe was placed into the panel prior to being placed into the cabinet for a length of 240 hours. The scribe was measured according to the protocol of Example 1. Average scribe creep is reported in Table 8 below. The measurements were made by the use of a Fowler Sylvac digital caliper Model S 235.

TABLE 8

Average Scribe Creep on 6111 Aluminum (CASS Testing)

| 6111 Aluminum | Treatment | Average Scribe Creep (mm) |
| --- | --- | --- |
| Set 12 | Rinse Conditioner 1 + Conversion Composition 1 (Comparative) | 2.33 |
| Set 13 | Conversion Composition 6 (Comparative) | 1.34 |
| Set 14 | Rinse Conditioner 1 + Conversion Composition 5 + Conversion Composition 7 (Experimental) | 0.81 |
| Set 15 | Rinse Conditioner 2 + Conversion Composition 5 + Conversion Composition 7 (Experimental) | 0.65 |

TABLE 9

Average Scribe Creep on 6022 Aluminum (CASS Testing)

| 6022 Aluminum | Treatment | Average Scribe Creep (mm) |
| --- | --- | --- |
| Set 12 | Rinse Conditioner 1 + Conversion Composition 1 (Comparative) | 1.52 |
| Set 13 | Conversion Composition 6 (Comparative) | 0.38 |
| Set 14 | Rinse Conditioner 1 + Conversion Composition 5 + Conversion Composition 7 (Experimental) | 0.56 |
| Set 15 | Rinse Conditioner 2 + Conversion Composition 5 + Conversion Composition 7 (Experimental) | 0.45 |

The data in Table 8 demonstrate that an electrocoated 6111 aluminum substrate panel pretreated with Rinse Conditioner 1 or Rinse Conditioner 2 followed by a fluoride-free zinc phosphate conversion composition and then a phosphatized epoxy resin-containing conversion composition results in a 65% reduction or a 72% reduction, respectively, in the scribe creep following 240 hours exposure to copper acetic salt spray (ASTM-B 368-09) compared to an electrocoated panel pretreated with Rinse Conditioner 1 followed by a fluoride-containing zinc phosphate conversion composition. The data in Table 8 also demonstrate that an electrocoated 6111 aluminum substrate panel pretreated with Rinse Conditioner 1 or Rinse Conditioner 2 followed by a fluoride-free zinc phosphate conversion composition and then a phosphatized epoxy resin-containing conversion composition results in a 39% reduction or a 51% reduction, respectively, in the scribe creep following 240 hours exposure to copper acetic salt spray (ASTM-B 368-09) compared to an electrocoated panel pretreated with Conversion Composition 6 (i.e., a zirconium pretreatment also containing molybdenum and lithium).

The data in Table 9 demonstrate that an electrocoated 6022 aluminum substrate panel pretreated with Rinse Conditioner 1 or Rinse Conditioner 2 followed by a fluoride-free zinc phosphate conversion composition and then a phosphatized epoxy resin-containing conversion composition results in a 63% reduction or a 70% reduction, respectively, in the scribe creep following 240 hours exposure to copper acetic salt spray (ASTM-B 368-09) compared to an electrocoated panel pretreated with Rinse Conditioner 1 followed by a fluoride-containing zinc phosphate conversion composition.

Two aluminum 6111 and two aluminum 6022 panels were also tested for filiform corrosion testing as G-85 A2 Cyclic Acidified Salt Fog Testing for 5 weeks of exposure to measure scribe creep. Prior to corrosion testing, the panels were scribed with an X-configuration. Each leg is 40 mm long. Corrosion damage is measured as the perpendicular distance from the scribe to tip of the filament or blister. Each panel provided two sets of five measurements: a set from the left leg, and another set from the right leg. Measurements were taken from the five longest corrosion sites along each leg. The average corrosion damage was calculated based on a total of ten measurements from two panels. The measurements were made by the use of a Fowler Sylvac digital caliper Model S 235. The results are listed here below in Tables 10 and 11.

TABLE 10

Average corrosion (mm) on 6111 Aluminum (G-85 A2 Filiform Testing)

| 6111 Aluminum | Treatment | Average Corrosion (mm) |
|---|---|---|
| Set 12 | Rinse Conditioner 1 + Conversion Composition 1 (Comparative) | 4.44 |
| Set 13 | Conversion Composition 6 (Comparative) | 4.55 |
| Set 14 | Rinse Conditioner 1 + Conversion Composition 5 + Conversion Composition 7 (Experimental) | 3.47 |
| Set 15 | Rinse Conditioner 2 + Conversion Composition 5 + Conversion Composition 7 (Experimental) | 3.39 |

TABLE 11

Average corrosion (mm) on 6022 Aluminum (G-85 A2 Filiform Testing)

| 6022 Aluminum | Treatment | Average Corrosion (mm) |
|---|---|---|
| Set 12 | Rinse Conditioner 1 + Conversion Composition 1 (Comparative) | 1.49 |
| Set 13 | Conversion Composition 6 (Comparative) | 1.03 |
| Set 14 | Rinse Conditioner 1 + Conversion Composition 5 + Conversion Composition 7 (Experimental) | 1.08 |
| Set 15 | Rinse Conditioner 2 + Conversion Composition 5 + Conversion Composition 7 (Experimental) | 1.06 |

The data in Table 10 demonstrate that an electrocoated 6111 aluminum substrate panel pretreated with Rinse Conditioner Composition 1 or Rinse Conditioner Composition 2 followed by a fluoride-free zinc phosphate conversion composition and then a phosphatized epoxy resin-containing conversion composition results in a 21% reduction or a 23% reduction, respectively, in corrosion (mm) following 5 weeks exposure to cyclic acidified salt fog testing (G-85 A2 filiform testing) compared to an electrocoated panel pretreated with Rinse Conditioner 1 followed by a fluoride-containing zinc phosphate conversion composition. The data in Table 10 also demonstrate that an electrocoated 6111 aluminum substrate panel pretreated with Rinse Conditioner Composition 1 or Rinse Conditioner Composition 2 followed by a fluoride-free zinc phosphate conversion composition and then a phosphatized epoxy resin-containing conversion composition results in a 23% reduction or a 25% reduction, respectively, in corrosion following 5 weeks exposure to cyclic acidified salt fog testing (G-85 A2 filiform testing) compared to an electrocoated panel pretreated with Conversion Composition 6 (i.e., a zirconium pretreatment also containing molybdenum and lithium).

The data in Table 11 demonstrate that an electrocoated 6022 aluminum substrate panel pretreated with Rinse Conditioner Composition 1 or Rinse Conditioner Composition 2 followed by a fluoride-free zinc phosphate conversion composition and then a phosphatized epoxy resin-containing conversion composition results in a 27% reduction or a 28% reduction, respectively, in corrosion following 5 weeks exposure to cyclic acidified salt fog testing (G-85 A2 filiform testing) compared to an electrocoated panel pretreated with Rinse Conditioner Composition 1 followed by a fluoride-containing zinc phosphate conversion composition.

Two panels of each of the following ferrous materials (Cold Rolled Steel, Hot Dipped Galvanized Steel, and Electrogalvanized Steel) were tested for scribe creep blistering according to GMW 14872. Scribe creep was measured from affected paint to affected paint to the left and right of the scribe. The scribe was placed into the panel prior to being placed into the cabinet for a length of 30 days/cycles. The scribe was measured according to the protocol of Example 1. Average scribe creep reported in Tables 12-14 below. The measurements were made by the use of a Fowler Sylvac digital caliper Model S 235.

TABLE 12

Average Scribe Creep on Cold Rolled Steel (GMW 14872)

| Cold Rolled Steel | Treatment | Average Scribe Creep (mm) |
|---|---|---|
| Set 12 | Rinse Conditioner 1 + Conversion Composition 1 (Comparative) | 2.70 |
| Set 13 | Conversion Composition 6 (Comparative) | 3.29 |
| Set 14 | Rinse Conditioner 1 + Conversion Composition 5 + Conversion Composition 7 (Experimental) | 2.38 |
| Set 15 | Rinse Conditioner 2 + Conversion Composition 5 + Conversion Composition 7 (Experimental) | 2.16 |

TABLE 13

Average Scribe Creep on Hot Dipped Galvanized (GMW 14872)

| Hot Dipped Galvanized | Treatment | Average Scribe Creep (mm) |
|---|---|---|
| Set 12 | Rinse Conditioner 1 + Conversion Composition 1 (Comparative) | 2.65 |
| Set 13 | Conversion Composition 6 (Comparative) | 3.26 |
| Set 14 | Rinse Conditioner 1 + Conversion Composition 5 + Conversion Composition 7 (Experimental) | 2.66 |
| Set 15 | Rinse Conditioner 2 + Conversion Composition 5 + Conversion Composition 7 (Experimental) | 2.23 |

TABLE 14

Average Scribe Creep on Electrogalvanized (GMW 14872)

| Electro-galvan-ized | Treatment | Average Scribe Creep (mm) |
|---|---|---|
| Set 12 | Rinse Conditioner 1 + Conversion Composition 1 (Comparative) | 2.22 |
| Set 13 | Conversion Composition 6 (Comparative) | 2.50 |
| Set 14 | Rinse Conditioner 1 + Conversion Composition 5 + Conversion Composition 7 (Experimental) | 1.83 |
| Set 15 | Rinse Conditioner 2 + Conversion Composition 5 + Conversion Composition 7 (Experimental) | 2.07 |

The data in Table 12 demonstrate that an electrocoated cold rolled steel substrate panel pretreated with Rinse Conditioner 1 or Rinse Conditioner 2 followed by a fluoride-free zinc phosphate conversion composition and then a phosphatized epoxy resin-containing conversion composition results in a 11% reduction or a 20% reduction, respectively, in scribe creep blistering (mm) following testing according to GMW 14872 compared to an electrocoated panel pretreated with Rinse Conditioner 1 followed by a fluoride-containing zinc phosphate conversion composition. The data in Table 12 also demonstrate that an electrocoated cold rolled steel substrate panel pretreated with Rinse Conditioner 1 or Rinse Conditioner 2 followed by a fluoride-free zinc phosphate conversion composition and then a phosphatized epoxy resin-containing conversion composition results in a 27% reduction or a 35% reduction, respectively, in scribe creep blistering (mm) following testing according to GMW 14872 compared to an electrocoated panel pretreated with Conversion Composition 6 (i.e., a zirconium pretreatment also containing molybdenum and lithium).

The data in Table 13 demonstrate that an electrocoated hot dip galvanized substrate panel pretreated with Rinse Conditioner Composition 1 or Rinse Conditioner Composition 2 followed by a fluoride-free zinc phosphate conversion composition and then a phosphatized epoxy resin-containing conversion composition results in a maintained performance or a 15% reduction, respectively, in scribe creep blistering (mm) following testing according to GMW 14872 compared to an electrocoated panel pretreated with Rinse Conditioner 1 followed by a fluoride-containing zinc phosphate conversion composition. The data in Table 13 also demonstrate that an electrocoated hot dip galvanized substrate panel pretreated with Rinse Conditioner Composition 1 or Rinse Conditioner Composition 2 followed by a fluoride-free zinc phosphate conversion composition and then a phosphatized epoxy resin-containing conversion composition results in a 18% reduction or a 31% reduction, respectively, in scribe creep blistering (mm) following testing according to GMW 14872 compared to an electrocoated panel pretreated with Conversion Composition 6 (i.e., a zirconium pretreatment also containing molybdenum and lithium).

The data in Table 14 demonstrate that an electrocoated electrogalvanized steel substrate panel pretreated with Rinse Conditioner Composition 1 or Rinse Conditioner Composition 2 followed by a fluoride-free zinc phosphate conversion composition and then a phosphatized epoxy resin-containing conversion composition results in a 17% reduction or a 6% reduction, respectively, in scribe creep blistering (mm) following testing according to GMW 14872 compared to an electrocoated panel pretreated with Rinse Conditioner 1 followed by a fluoride-containing zinc phosphate conversion composition. The data in Table 14 also demonstrate that an electrocoated electrogalvanized substrate panel pretreated with Rinse Conditioner 1 or Rinse Conditioner 2 followed by a fluoride-free zinc phosphate conversion composition and then a phosphatized epoxy resin-containing conversion composition results in a 26% reduction or a 17% reduction, respectively, in scribe creep blistering (mm) following testing according to GMW 14872 compared to an electrocoated panel pretreated with Conversion Composition 6 (i.e., a zirconium pretreatment also containing molybdenum and lithium).

Whereas particular features of the present invention have been described above for purposes of illustration, it will be evident to those skilled in the art that numerous variations of the details of the coating composition, coating, and methods disclosed herein may be made without departing from the scope in the appended claims.

We claim:

1. A system for treating a multi-metal article comprising:
    (a) a first conversion composition for treating at least a portion of a non-aluminum metal surface of the multi-metal article, the first conversion composition comprising phosphate ions and zinc ions and being substantially free of fluoride; and
    (b) a second conversion composition for treating at least a portion of an aluminum metal surface of the multi-metal article, the second conversion composition comprising a lanthanide series metal cation and an oxidizing agent; and/or
    (c) a third conversion composition for treating at least a portion of the aluminum surface, the third conversion composition comprising an organophosphate compound, an organophosphonate compound, or combinations thereof;
    wherein the multi-metal article comprises (1) an article that comprises the non-aluminum metal surface and the aluminum metal surface, (2) a first article comprises the non-aluminum metal surface and a second article comprises the aluminum metal surface, or (3) both (1) and (2); and
    wherein the first conversion composition does not deposit on the aluminum metal surface.

2. The system of claim 1, further comprising an activating rinse for contacting at least a portion of the surface prior to the contacting with the first conversion composition, the activating rinse comprising a dispersion of metal phosphate particles having a D90 particle size of no greater than 10 μm, wherein the metal phosphate comprises divalent or trivalent metals or combinations thereof.

3. The system of claim 2, wherein the metal phosphate particles have a D90 particle size of no more than 1 μm.

4. The system of claim 1, further comprising an activating rinse for contacting at least a portion of the surface prior to the contacting with the first conversion composition, the activating rinse comprising colloidal titanium-phosphate particles.

5. The system of claim 1, wherein the lanthanide series metal cation is present in the second conversion composition in an amount of 50 ppm to 500 ppm (calculated as metal cation) based on total weight of the second conversion composition.

6. The system of claim 1, wherein the third conversion composition has a solids content of 0.5% to 15% based on total composition.

7. The system of claim 1, wherein the third conversion composition has a pH of 3 to 7.

8. The system of claim 1, wherein the third conversion composition is substantially free of transition metal.

9. The system of claim 1, wherein the third conversion composition comprises a transition metal cation present in an amount of 50 ppm to 500 ppm based on total weight of the third conversion composition.

10. The system of claim 1, wherein the organophosphate compound comprises a phosphatized epoxy.

11. The system of claim 1, wherein the system is substantially free of fluoride.

12. The system of claim 1, wherein the second conversion composition and/or the third conversion composition is substantially free of copper.

13. A method for treating a multi-metal article comprising:
   (a) contacting at least a portion of a non-aluminum metal surface of the multi-metal article with a first conversion composition comprising phosphate ions and zinc ions and being substantially free of fluoride; and
   (b) contacting at least a portion of an aluminum metal surface of the multi-metal article with a second conversion composition comprising a lanthanide series metal cation and an oxidizing agent; and/or
   (c) contacting at least a portion of the aluminum surface with a third conversion composition comprising an organophosphonate compound, an organophosphate compound, or combinations thereof;
   wherein the multi-metal article comprises (1) an article that comprises the non-aluminum metal surface and the aluminum metal surface, (2) a first article comprises the non-aluminum metal surface and a second article comprises the aluminum metal surface, or (3) both (1) and (2); and
   wherein the first conversion composition does not deposit on the aluminum metal surface.

14. The method of claim 13, further comprising contacting at least a portion of the surface with an activating rinse prior to contacting the surface with the first conversion composition, wherein the activating rinse comprises a dispersion of metal phosphate particles having a D90 particle size of no greater than 10 um, wherein the metal phosphate comprises divalent or trivalent metals or combinations thereof.

15. The method of claim 13, wherein the contacting with the second conversion composition results in a level of the lanthanide series metal cation on the treated substrate surface of at least 100 counts greater than on a surface of a substrate that is not contacted with the first and second conversion compositions as measured by X-ray fluorescence (as measured using X-Met 7500, Oxford Instruments; operating parametrs 60 second timed assay, 15Kv, 45μA, filter 3, T(p)=1.5μs for lanthanide).

* * * * *